United States Patent
Kiyota et al.

(10) Patent No.: US 8,762,404 B2
(45) Date of Patent: Jun. 24, 2014

(54) INFORMATION SEARCH SYSTEM, METHOD, AND PROGRAM, AND INFORMATION SEARCH SERVICE PROVIDING METHOD

(75) Inventors: Yoji Kiyota, Tokyo (JP); Hiroshi Nakagawa, Tokyo (JP)

(73) Assignee: The University of Tokyo, Tokyo (JP)

( * ) Notice: Subject to any disclaimer, the term of this patent is extended or adjusted under 35 U.S.C. 154(b) by 527 days.

(21) Appl. No.: 12/672,775

(22) PCT Filed: Mar. 3, 2008

(86) PCT No.: PCT/JP2008/053760
§ 371 (c)(1),
(2), (4) Date: Feb. 9, 2010

(87) PCT Pub. No.: WO2009/025095
PCT Pub. Date: Feb. 26, 2009

(65) Prior Publication Data
US 2011/0213796 A1     Sep. 1, 2011

(30) Foreign Application Priority Data
Aug. 21, 2007  (JP) .................................. 2007-214405

(51) Int. Cl.
*G06F 17/30* (2006.01)
(52) U.S. Cl.
USPC ............................ 707/769; 707/770; 707/779
(58) Field of Classification Search
USPC ........................... 707/769, 999.005, 770, 776
See application file for complete search history.

(56) References Cited

U.S. PATENT DOCUMENTS

| | | | |
|---|---|---|---|
| 2002/0042793 A1* | 4/2002 | Choi | 707/6 |
| 2002/0059289 A1 | 5/2002 | Wenegrat et al. | |
| 2004/0167862 A1* | 8/2004 | Yabloko | 706/55 |
| 2005/0256867 A1 | 11/2005 | Walther et al. | |
| 2006/0004703 A1* | 1/2006 | Spivack et al. | 707/999.002 |
| 2006/0155694 A1* | 7/2006 | Chowdhury et al. | 707/999.004 |
| 2007/0106657 A1* | 5/2007 | Brzeski et al. | 707/999.005 |
| 2007/0106662 A1* | 5/2007 | Kimbrough et al. | 707/999.005 |

(Continued)

FOREIGN PATENT DOCUMENTS

| | | |
|---|---|---|
| JP | A-8-314956 | 11/1996 |
| JP | A-10-273208 | 10/1998 |
| JP | A-2007-102487 | 4/2007 |

OTHER PUBLICATIONS

Spyns et al., From Folksologies to Ontologies: How the Twain Meet, Springer-Verlag Berlin Heidelberg 2006, pp. 738-755. Retrieved on Jun. 3, 2012 from http://www.springerlink.com/content/q580x76132r281k6/fulltext.pdf.*

(Continued)

*Primary Examiner* — Monica Pyo
(74) *Attorney, Agent, or Firm* — Oliff PLC

(57) ABSTRACT

A dialogical information search system is realized by comprehensively utilizing different kinds of ontologies: a library classification system and a Wikipedia category.

A new information search infrastructure is thus realized by comprehensively utilizing the different ontologies of library classification system and Wikipedia category. By virtue of this, a new information search paradigm can be promoted to the world: an in-depth search is realized by utilizing a library with the Web as a clue. This, as a result, contributes to improving literacy of the whole society, and conduces to rediscovering the significance of existence of libraries and further to realizing electronic libraries.

21 Claims, 15 Drawing Sheets

A comparison between a library classification system and the Wikipedia category

| | Library classification system (BSH4) | Wikipedia (Category) |
|---|---|---|
| Approach | Top-down-like | Bottom-up-like |
| Merit | Stable Deeply organized | Reflecting various points of view Responding to new concepts |
| Demerit | Unable to reflect various points of view New concepts not included | Unstable Shallowly organized |
| Parent category | Only one | More than one is possible |
| Total category number | 11,184 | 15,532 |
| Matched category names | 1,363 | |

(August 2006)

(56) References Cited

U.S. PATENT DOCUMENTS

| | | |
|---|---|---|
| 2007/0219986 A1* | 9/2007 | Egozi ..................... 707/999.005 |
| 2007/0239707 A1* | 10/2007 | Collins et al. .......... 707/999.005 |
| 2008/0004864 A1* | 1/2008 | Gabrilovich et al. ............. 704/9 |
| 2008/0091633 A1* | 4/2008 | Rappaport et al. .............. 706/50 |

OTHER PUBLICATIONS

Spiteri, The Use of Collaborative Tagging in Public Library Catalogs, 2006 OCLC/ALISE Library and Information Science Research Grant Project, Feb. 26, 2007. Retrieved on Jun. 3, 2012 from http://cdm267701.cdmhost.com/cdm/singleitem/collection/p267701coll27/id/271.*

Arch, Creating the Academic Library Folksonomy, C& RL News, Feb. 2007. Retrieved on Jun. 3, 2012 from http://crln.acrl.org/content/68/2/80.full.pdf.*

McCarthy et al., Folksonomies in Action, Dec. 2006. Retrieved on Jun. 3, 2012 from http://folksonomiesinaction.blogspot.com/.*

Mar. 25, 2008 International Search Report issued in International Application No. PCT/JP2008/053760 (with translation).

Yoji Kiyota et al., "Automated Subject Induction from Query Keywords through Wikipedia Categories and Subject Headings", Mar. 19, 2005, pp. 35-38, Japan. (with translation).

Kazuaki Kishida, The Journal of Information Science and Technology Association, Feb. 1, 2007, vol. 57, No. 2, pp. 62-67, Japan. (with abstract and concise statement of relevance).

Makoto Inoue, "Ask the Library!", pp. 174-177, 2004, Chikuma New Books, Japan. (with partial translation).

Motomu Fukuda, "Consideration on the Communication Technology in Digital Reference Service", 2002, pp. 73-83, No. 20, Joho Kagaku Kenkyu, Japan. (with abstract).

Mitsuhiro Oda, "Today's Digital Reference Service", 2006, pp. 84-89, vol. 56, No. 3, Japan (with abstract).

Academic Information Infrastructure Center Working Group et al., Mar. 23, 2006, Japan. (with partial translation).

Taishi Hirata et al., "Construction of a Library Automatic Reference Service System", Mar. 2000, pp. 463-466, Japan. (with abstract).

Yoji Kiyota et al., "Dialog Navigator: A Question Answering System based on Large Text Knowledge Base", Jul. 2003, pp. 1-30, vol. 10, No. 4, Japan. (with abstract).

Susumu Kanemune, "Wikipedia as a Digital Reference Tool", 2006, pp. 103-107, vol. 56, No. 3, Japan. (with abstract).

Kiyoshi Mori, "Nippon Decimal Classification", 1995, the New Ninth Version, Japan Library Association, Japan. (with translation).

Japan Library Association Subject Headings Committee, "Basic Subject Headings", 1999, $4^{th}$ version, Japan Library Association, Japan. (with concise statement of relevance).

Fumio Saito, "The Reference Service for Library Users", Jun. 1, 2001, No. 81, Japan Library Association, Japan. (with concise statement of relevance).

Laura Cohen et al., "A Comparison of Research University and Two-Year College Library Web Sites: Content, Functionality, and Form", May 1999, pp. 275-289, vol. 60, No. 3, College and Research Libraries, USA.

Sadao Kurohashi et al., "An automatic reference service system in Kyoto University Library", Jun. 2001, pp. 184-189, vol. 44, No. 3, Japan. (with abstract).

Masao Nagasawa, 1994, $3^{rd}$ version, Maruzen Co., Ltd., Japan (with concise statement of relevance).

Yui Kuniyasu et al., "For the Realization of an Automatic Reference Service System: A Reference Service Business Analysis on Tokyo University Library", 2006, pp. 101-104, Japan. (with translation).

Mar. 25, 2008 Written Opinion issued in International Application No. PCT/JP2008/053760 (with partial translation).

* cited by examiner

Fig. 1

A comparison between a library classification system and the Wikipedia category

| | Library classification system (BSH4) | Wikipedia (Category) |
|---|---|---|
| Approach | Top-down-like | Bottom-up-like |
| Merit | Stable Deeply organized | Reflecting various points of view Responding to new concepts |
| Demerit | Unable to reflect various points of view New concepts not included | Unstable Shallowly organized |
| Parent category | Only one | More than one is possible |
| Total category number | 11,184 | 15,532 |
| Matched category names | 1,363 | (August 2006) |

INFORMATION SEARCH SYSTEM, METHOD, AND PROGRAM, AND INFORMATION SEARCH SERVICE PROVIDING METHOD

TECHNICAL FIELD

The present invention relates to a method and system for searching data more efficiently by combining library ontology and ontology on the Web. The present invention further relates to a program for forming such system.

BACKGROUND ART

A. The Course Leading to the Invention

First, descriptions will be made with respect to the course leading to the present invention, and to the investigations and researches made by the inventors.

In recent years, digital reference services (DRS) have become popular among college libraries and public libraries. As used herein, "DRS" refers to a reference service which accepts various questions from the users by utilizing the Internet.

However, at the present time, the mainstream DRS's available do not have an interview function such as that which will be described hereinafter, and thereby may not be necessarily regarded as effective in the case that objects to be investigated or facts to be searched are indefinite.

A-1. Conventional Library Service Systems

Conventional libraries provide various services, one of which is referred to as a reference service.

The reference service is a human resource service that librarians assist the users to search materials and information. It is also compared to "a library concierge service" (see Non-patent Document 1).

Commonly, this service receives very general and far-ranging questions such as, for example, those as follows:

(a) Library guide: Please tell me how to use OPAC.
(b) Collection inquiry: Does Tokyo University Library have a Kabuki character dictionary?
(c) Document search: I am searching for a book about the peasant revolt in the Edo Period.
(d) Item investigation: Where is the "University" of the "University Sweet Potato" in Tokyo University?

The reference service is one of the primary library services for meeting various information needs from the users. Nevertheless, the service is only available inside libraries, and the service hours are also limited. Further, it is also desired to enjoy the library services without visiting a library by the working people, the elderly, the physically-challenged, the residents of remote islands and mountain areas, and the like.

A-2. Digital Reference Service (DRS)

For the above reason, in recent years, attentions are attracted by the digital reference service (DRS) which accepts questions from the users by utilizing the Internet.

In terms of time characteristic, the DRS can be classified either as an asynchronous service or as asynchronous service. The difference between the two stands in whether real time answers are acquirable or not.

DRS's utilizing emails are known as popular asynchronous services. Such services are useful because questions can be asked at any time from anywhere. Yet the defect is that they are unfit for interviews with the users, which have played an important role in the conventional reference services.

On the other hand, synchronous services in the form of chat are chiefly provided in the United States. However, such services require stationed staff members and thereby have a problem that the running cost is high.

Since there are limitations on human resources available for the reference services, it is difficult for libraries with the current systems to meet the needs of all users.

Therefore, it is strongly desired to have an online system capable of automatically carrying out the reference responses which are now made by librarians.

In view of the above, the inventors have first made a business analysis on a currently provided reference service to acquire the necessary knowledge for the realization of an automatic reference service system.

A-3. Current Business Analysis

In particular, in cooperation with Tokyo University Library, investigations have been made with respect to the inclinations of users' questions, resources frequently referred to by the repliers, and the like.

Business Analysis on the Reference Service in Tokyo University Library

The reference service currently provided in Tokyo University Library can be classified broadly into the following three categories:

(a) Receiving questions at the counter;
(b) Written requests for reference searches; and
(c) ASK service.

A-3-1. Questions at the Counter

According to the statistics made in 2005, at the counter of Tokyo University Library, there were 6,630 questions received in that year. The category and number are as follows:

(a) Library guide: 3,984;
(b) Collection inquiry: 1,675;
(c) Document search: 718;
(d) Item investigation: 233; and
(e) Others: 20.

| (a) | Library guide: | 3,984; |
| (b) | Collection inquiry: | 1675; |
| (c) | Document search: | 718; |
| (d) | Item investigation: | 233; and |
| (e) | Others: | 20. |

It was found out that a large portion of the most questions in the library guide belonged to the existing frequently asked questions, which could be instantly answered by the librarians. Further, it was also found out that many of these questions had already had their answers provided in the library guide pamphlet and the like.

A-3-2. Questions and Answers in Written Form

The following list shows the category and number of the questions received in 2005 through facsimile, mailing, and email.

(a) Library guide: 5;
(b) Collection inquiry: 1,550;
(c) Document search: 175;
(d) Item investigation: 170; and
(e) Others: 90.

| (a) | Library guide: | 5; |
| (b) | Collection inquiry: | 1,550; |
| (c) | Document search: | 175; |
| (d) | Item investigation: | 170; and |
| (e) | Others: | 90. |

Investigations were made on what resources were utilized by the librarians with respect to these questions.

The result is:

(a) OPAC (Online Public Access Catalog) was searched;

(b) If the subject was not found in (a), it was further searched for with the all-university central catalog cards; and (c) If the subject was not found in (b) either, it was regarded as out of the collection of Tokyo University, and thereby further searched for with NACSIS Webcat to investigate if other colleges had it.

Further, many reference information resources were also utilized. For example, there were systems capable of collectively searching for a plurality of contents online such as JapanKnowledge.

It is considered difficult, however, for the users to precisely take hold of which resource should be utilized for the purpose under the current service system.

A-3-3. ASK Service

ASK service is one of the DRS's provided by Tokyo University Library. The ASK service is a system wherein reference questions are made through the Web, and answers are received through emails.

The following list shows the category and number of the questions received by the ASK service.

(a) Library guide: 219;
(b) Collection inquiry: 21;
(c) Document search: 11;
(d) Item investigation: 12; and
(e) Others: 9.

| (a) | Library guide: | 219; |
| (b) | Collection inquiry: | 21; |
| (c) | Document search: | 11; |
| (d) | Item investigation: | 12; and |
| (e) | Others: | 9. |

Then, it is found out that most of the questions in the above library guide are about the troubles with electronic journals. Therefore, the ASK service is currently used as a service center of trouble shooting for the electronic journals.

As a result of such current service analysis, problems have been recognized as below.

1. The information and resources provided by the library have not been put in order as a system which is easy for the users to understand. That is, it is necessary to systematically organize the know-how and existing online resources in possession of the library.

2. The DRS with an interview function has not been systemized. That is, the DRS could be considered effective if a dialogical inquiry were possible. There are chat-centered DRS's provided in the United States, yet there are difficulties in Japan due to the shortage of librarians.

In view of the above paragraph 1, it is understood that there is a necessity to systematically organize the know-how and existing online resources in possession of the library.

To address this problem, the following Nonpatent Document 4, for example, discloses the building and provision of a pathfinder which has simply and easily organized the procedures for collecting materials and information with respect to a specific topic as an education support service in which college libraries should be actively engaged from now on. However, since the current pathfinder is made manually with respect to each topic, there are problems that, for example, the cost is high and the coverage is narrow.

Further, in view of the above paragraph 2, it is understood that the DRS with a dialogical interface is effective. For example, there are known the reference service system of Kyoto University Library (see the following Nonpatent Document 5) and the DialogueNavi (see the following Nonpatent Document 6).

Based on the above analysis, the inventors have deeply realized that there is a necessity to have a system which automatically organizes and dialogically presents the materials, guides and the like for supporting users' information searches in accordance with users' information requirements. In other words, it has become obvious that "on-demand creation of a pathfinder" is widely desired.

In order to establish such kind of systems, it is necessary to comprehensively utilize various online resources inside and outside libraries such as the knowledge about how to use a library, OPAC, encyclopedias, Web search engines, and the like.

Especially, the inventors consider that it is sufficiently possible to utilize as a reference tool the folksonomic ontology represented by Wikipedia which is established through collaboration on the Internet, because it has recorded more items with a wider range than the existing encyclopedias (see Nonpatent Document 7).

Hence, the inventors have developed an information search tool which has a dialogical interface and which relates the folksonomic ontology to a library classification.

B. The Information Search Tool of the Present Invention

Under the circumstances as described above, descriptions will be made hereinafter in sequence including the technological background with respect to how the inventors have come to the building of a comprehensive browsing tool. In addition, one of the characters of the present invention stands in the development of a comprehensive browsing tool of different kinds of ontologies (corresponding relationship between a library classification system and a folksonomic ontology category). Detailed descriptions will be made hereinbelow.

B-1. Prior to the Popularization of the Internet

Before the Internet became popularized, it was libraries that had played a primary role in information search. Libraries had various useful tools which organized and systemized voluminous materials for serving the users in the information search.

For example, Nihon Decimal Classification (NDC, see Nonpatent Document 8), Basic Subject Headings (BSH, see Nonpatent Document 9) and the like are among the representative tools.

In recent years, the Web (the Internet) is taking the place of libraries to become the leading player in information search.

B-2. After the Popularization of the Internet

After the Internet became popular, at "the beginning", Web directories such as Yahoo! and the like were widely used. Around the year of 2000, later than the Internet popularization period (from 1995), practical Web search engines, such as Google and the like, came out on the Internet, whereby there became widely utilized a mechanism which was capable of searching out some Web page(s) in responding to most of the search questions. This is still widely used at the present time without change.

However, it is hard to say that the enormous amount of information on the Web has been sufficiently organized, and it is not always easy to find the page which meets the information requirement.

In recent years, by making use of Web technologies and through multiperson collaborations, great efforts have been made to organize the huge amount of knowledge. As representative examples, there are known Wikipedia (http://ja.wikipedia.org), and various folksonomic services such as Flicker (http://flickr.com) and the like.

As a result, there has been formed on the Web something which may be called a kind of information search ontology. There is a great advantage that many people's various points of view are reflected in such ontology; the limitation thereon, however, is also well known.

People involved in establishing such ontology have a central motivation which may be expressed as: "to be able to efficiently search for the information which satisfies their interests". Therefore, the points of view from "the information consumers" are greatly reflected.

However, it is hard to reflect the points of view of the information producers, in other words, people who have intellectual curiosities such as to search out information which has not been much known up to the present, to bring forth new insights, etc. This is because such people tend to be motivated to conceal the whereabouts of the information resources which they consider as is valuable.

As a result, the ontology existing on the Web tends to stay shallowly organized, and thereby is not necessarily suitable for the use of digging deeply into the search.

On the other hand, new currents have also come into view in the library sphere in responding to the changes occurring in the Web sphere. For example, in the reference services which have been playing the role as a service counter for information searches in libraries, attempts are being made to make use of Wikipedia as a reference tool (see Nonpatent Document 7). However, at present, reference services remain in a state that they per se are not generally pervasive (see Nonpatent Document 10).

Further, efforts are also actively made to disclose on the Web the information resource which is referred to as a pathfinder listing related materials which libraries can provide on each specific topic (see Nonpatent Document 11). However, since it requires the libraries to spend manpower in establishing such pathfinders, only a very small portion of the topics can be covered in comparison with the ontology existing on the Web. This shows that libraries have not yet caught up with the Web in terms of changing rapidity.

In this manner, as it now stands, there are respective problems with information searches on the Web and at libraries.

In view of the above problems, the inventors consider it as a solution to "relate the library classification system to the various kinds of ontologies established on the Web, and make use of the related system as a new infrastructure for information search".

Through the realization of such a system with the above capability, it is possible to lead an information search with the Web as its start point to an in-depth search which makes use of a library. Further, it is conceivable that this will also lead to rediscovering the significance of existence of libraries.

In particular, the inventors have compared the library classification system (herein, NDC, BSH) with Wikipedia as an ontology (especially the category system of Wikipedia) and, based thereon, proposed in part B-2 a comparative relation between the both and a method for the comprehensive utilization of it in information search with an explanation of its usability.

Further, in "3. Reference Navigator" of the aftermentioned "Best Mode for Carrying Out the Invention", the Reference Navigator as a comprehensive browsing tool of different kinds of ontology will be described.

B-3. Comparison Between Library Classification System and Wikipedia

Hereinafter, a comparison between a library classification system as an information search tool and Wikipedia will be made, their respective merit and demerit being organized and described.

B-3-2. Library Classification System

Generally, the system is under management of the specialists in library and information science. For example, Japan Library Association has organized a committee to revise Nihon Decimal Classification (NDC), Basic Subject Headings (BSH) and the like. At present, NDC 9th Version (NDC 9) and BSH 4th Version (BSH 4) are the latest versions.

Since the system is established in a top-down-like manner through the specialists' cautious works, there is a merit that it can be stably utilized and is deeply organized.

Further, there are various subject headings known as BSH, LCSH (Library of Congress Subject Headings), NDLSH (National Diet Library Subject Headings), and the like. They are all useful tools.

On the negative side, since their revision periods are generally long, there are difficulties in responding to new concepts.

Besides, since a concept can generally have only one superordinate concept in the system, it may be difficult to reflect various aspects of the concept. Further, since the subject headings are commonly provided in a book form, there is a problem that it is difficult for the ordinary users to utilize.

B-3-3. Wikipedia

Wikipedia is a coedited online encyclopedia through the Wiki system on the Web. It can be edited freely by anyone from anywhere.

Because many people are involved in the editing, it is considered that at covers most of the concepts all over the world and has a character of being easy to hyperlink. Efforts are also being made to organize the items which make full use of this character.

In order to efficiently create a list from a huge number of items, there is introduced a bottom-up-like organization mechanism called the "Wikipedia category". By virtue of this mechanism, it is possible to classify the items from various points of view. This is similar to the folksonomy. Hence, the Wikipedia category can be regarded as a sort of folksonomic ontology.

For example, to the item "price", a plurality of categories can be affixed such as "marketing", "economics", "market" and the like. Further, to the category per se, a superordinate (parental) category can be affixed as well. The capability of affixing a plurality of parents is a significant character which does not exist in the conventional classification system.

On the negative side, there is a problem that it is frequently edited and thereby the system is not stabilized. Further, defects are also pointed out such as there is no small amount of information which lacks credibility. Therefore, various efforts have been made to secure the credibility, yet it is often pointed out that those efforts are no more than supportive measures. Furthermore, as described above, the system remains shallowly organized in many aspects.

B-3-4. Method and Principle Proposed in the Present Invention

There are different merits and demerits in the library classification system as an information search tool and the folksonomic ontology represented by Wikipedia, respectively. This is shown in FIG. 1.

As shown in FIG. 1, as an approach, contrary to the top-down-like library classification system, the folksonomic ontology is bottom-up-like. Further, as the merits, the library classification system is "stabilized" and "deeply organized", while the folksonomic ontology excels in "reflecting various points of view" and "responding to new concepts". On the other hand, as the demerits, there are the difficulty in "reflecting various points of view" and "exclusion of new concepts" on the library classification side whereas the "instability" and "shallow organization" on the folksonomic ontology side.

Further, only "one" parental category can be held on the library classification side, whereas "a plurality of" parental categories are possible on the Wikipedia side.

Further, there are totally 11,184 categories on the library classification side whereas 15,532 on the Wikipedia side. Here, it should be noted that the numbers in FIG. 1 are representative examples of the respective classification systems (the library classification→BSH; the folksonomic ontology→Wikipedia category). Further, there are 1,363 category names in common between the library classification side and the Wikipedia side (in August 2006).

In this manner, there are various differences in merit and demerit between the both sides, whereby it is useful to separately utilize the both in an appropriate manner on the basis of such differences in the information search.

In the embodiment of the present invention, there is proposed a comprehensive application method wherein by relating the common portions held by both, the folksonomic ontology is utilized as a start point of an information search; then, the concept is generalized to be introduced into the library classification system.

B-3-5. An Application Example

FIG. 2 shows an application example of information search. First, descriptions will be made with respect to the utilization of Wikipedia as a start point of an information search. Here, to the Wikipedia article "The Great Hanshin-Awaji Earthquake", "Japan's economic history" and "earthquake history" are affixed as categories. Further, to the category "Japan's economic history", "economic history" is affixed as the superordinate category. Further, to the category "earthquake history", "history of disaster and its prevention" and "earthquake" are affixed as the superordinate categories. In this manner, taking up an article of Wikipedia to see, it should be understood that the related category group can be taken out as a tree structure.

Following this tree structure, gateways for investigation on the Great Hanshin-Awaji Earthquake will become obvious.

For example, following "Japan's economic history"→"economic history", it becomes clear that investigation can be made on "the influence brought by the Great Hanshin-Awaji Earthquake on Japan's economy".

On the other hand, following "earthquake history"→"earthquake", it becomes clear that investigation can be made on "the earthquake bringing on the Great Hanshin-Awaji Earthquake (that is, the Southern Hyogo Prefecture Earthquake in 1995)".

As a result, it is possible to investigate the search subject "the Great Hanshin-Awaji Earthquake" by generalizing it into "economic history", "disaster" and "earthquake".

B-3-6. Relation

Next, descriptions will be made with respect to the relation between the Wikipedia category and the library classification system (BSH, NDC), and to the utilization of the library classification system.

As will be described hereinafter, there are matched category names between the Wikipedia category and the library classification system. In the aforementioned FIG. 2, "economic history", "disaster" and "earthquake" are matched. Utilizing the matching, it is possible through the library classification system to more deeply dig into the search subject which is generalized by utilizing Wikipedia. For example, following "economic history"→"economic history—Japan"→"economic history—Japan—the Heisei Period", "Economics Dictionary" (Nihon Keizai Shimbun Inc., 1996) and the like can be found through the NDC classification symbol 332.107. Further, following "earthquake"→"earthquake-resistant construction", "Earthquake and Condominiums" (Hidekazu NISHIZAWA, et al., Chikuma Books, 2000) and the like can be found through the subject "earthquake-resistant construction".

B-3-7. Advantages of the Proposed Method and Principle

It is obvious that the comprehensive utilization approach described above is highly effective because of the following reasons.

Reason 1: the Existence of Overlaps

As shown in the lower portion of FIG. 1, there are many matched category names between the library classification system (BSH4) and the Wikipedia category. There are 1,363 categories matched out of 15,532 categories of Wikipedia. Thereby, it is considered as highly possible to lead Wikipedia items into library information resources.

Further, if similar category names can also be related to each other, the possibility will become higher. This means a result in effective utilization of the library information resources.

Reason 2: Coverable of Wide-Ranging Concepts

It is possible through the relation to Wikipedia categories to make up for the demerit that "there are only a few items and new concepts are not covered" in the library classification system (especially BSH). That is, because the start point for an information search can be set up with a great number of the items included in Wikipedia, (potentially) it is possible to deal with virtually every concept from all over the world.

Reason 3: Converging of Information Search

The Wikipedia category is established in a bottom-up-like manner, and thereby often remains shallowly organized. Utilizing the Wikipedia category for an information search as it is may bring about the same results as those from the so-called Web surfing, whereby the search may diverge at a high possibility. By utilizing the Wikipedia category in relation to the library classification system, the information search converges, thereby being able to lead to an in-depth search.

B-4. Reference Navigator

The inventors have made up a comprehensive browsing tool called "Reference Navigator" of different kinds of ontology as their first attempt to comprehensively utilize the aforementioned library classification system and Wikipedia.

FIG. 3 shows an example of the interface page of this tool.

The tool utilizes a relational database to store therein a Web directory structure established by Open Directory Project in addition to the ontological structure of Wikipedia, NDC 9 and BSH 4, thereby allowing a comprehensive search.

After a search subject (a Wikipedia item name) is input into the textbox at the top, its superordinate category names and the like are displayed as hyperlinks. At this stage, if any of the category names has been clicked, the superordinate category names, the subordinate category names and the like of the category will be further displayed. If the same category name is also included in another ontology than Wikipedia, those superordinate category names and subordinate category names will also be displayed at the same time. Therefore, as the user repeats his/her clicks, he/she can deepen the information search and acquire the clue for finding library information resources.

Especially, this Reference Navigator has, as will be described in detail hereinafter, the following characteristics.

(1) Relation between similar category names

The relation between Wikipedia and the current library classification system is not limited to the category names completely matched at the character string level, but applicable to those similar to each other as well. Especially, the present invention utilizes the natural language processing to relate similar category names with a high degree of accuracy. For example, it is possible to relate the portions shown in FIG. 2 with the dashed lines:

"the Great Hanshin-Awaji Earthquake"←→"earthquake disaster"; and

"Japan's economic history"+"the Heisei Period"←→"NDC 332.107".

(2) Automatic Creation of a Pathfinder

As described above, some pathfinders established in a few libraries are useful tools for information searches. However, since they are manually made, there is a problem that only a significantly small number of items are covered therein. To address this problem, by automatically estimating the NDC classification symbol and the like against the Wikipedia item and thereby finding the reference book and the like with the symbol affixed thereto from the library catalog (OPAL), the pathfinder can be automatically created with respect to any concept.

(3) Realization of an Automatic Reference Service System

By developing the methodologies of the reference service system of Kyoto University Library (see Nonpatent Document 12), DialogueNavi (See Nonpatent Document 6) and the like, there has been established a system for supporting the library users to search information in a dialogical manner. In particular, there is established a system which utilizes as its knowledge base various metaknowledge with respect to the information search (see Nonpatent Document 13) in addition to the aforementioned comprehensive ontology.

C. Patent and Nonpatent Documents of the Related Art

In the following Patent Document 1, there is described a material information search method utilizing the related file of a classification number system. It is specifically described that noticing that the classification number system has a hierarchical structure, it is possible to replace the search key by the classification number while referencing at both the superordinate and the subordinate levels.

Further, in the following Patent Document 2, there is disclosed a book storage management system utilizing RFID. It is specifically described that by utilizing RFID, it is possible to collectively read in a plurality of book data.

Further, in the following Patent Document 3, there are disclosed a bibliotheca search method, a bibliotheca search system and the like. According to the system described therein, it is possible to carry out the search under various conditions.

[Patent Document 1] Japanese Unexamined Patent Application Publication No. 08-341956.

[Patent Document 2] Japanese Unexamined Patent Application Publication No. 10-273208.

[Patent Document 3] Japanese Unexamined Patent Application Publication No. 2007-102487.

[Nonpatent Document 1] Makoto INOUE: Ask the Library!. Chikuma New Books, 2004.

[Nonpatent Document 2] Motomu FUKUDA: Consideration on the Communication Technology in Digital Reference Service. JOHO KAGAKU KENKYU, No. 20, pp. 29-40, 2002.

[Nonpatent Document 3] Mitsuhiro ODA: Today's Digital Reference Service. JOHO NO KAGAKU TO GIJUTSU, Vol. 56, pp. 84-89, 2006.

[Nonpatent Document 4] Academic Information Infrastructure Center Working Group, Research Environment Infrastructure Group, Academic Special Interest Group, Science Technology and Academy Council, Ministry of Education, Culture, Sports, Science and Technology: GAKUJUTSU JOHO KIBAN NO KONGO NO ARIKATA NI TSUITE (Report), 2006.

[Nonpatent Document 5] Taishi HIRATA, Wataru HIGASA, Koki FUJII and Sadao KUROHASHI: Construction of a Library Automatic Reference Service System. Presented Papers of the Sixth Annual Conference of GENGO SHORI GAKKAI, 2000.

[Nonpatent Document 6] Yoji KIYOTA, Sadao KUROHASHI, and Fuyuko MITO: DialogueNavi: Automatic Question and Answer Based On Large-scale Text Knowledge. SHIZEN GENGO SHORI, Vol. 10, No. 4, pp. 145-175, 2003.

[Nonpatent Document 7] Susumu KANEMUNE: Wikipedia as a Digital Reference Tool. JOHO NO KAGAKU TO GIJUTSU, Vol. 56, pp. 103-107, 2006.

[Nonpatent Document 8] Kiyoshi MORI, Japan Library Association Classification Committee (edited): Nihon Decimal Classification, the New Ninth Version, Japan Library Association, 1995.

[Nonpatent Document 9] Japan Library Association Subject Headings Committee (edited): Basic Subject Headings (BSH), the Forth Version, Japan Library Association, 1999.

[Nonpatent Document 10] Fumio SAITO: The Reference Service for Library Users. Proceeding of Japan Library Association, No. 81, 2001.

[Nonpatent Document 11] Laura B. Cohen and Julie M. Still: A Comparison of Research University and Two-year College Library Websites: Content, Functionality, and Form. College and Research Libraries, Vol. 60, No. 3, pp. 275-289, 1999.

[Nonpatent Document 12] Sadao KUROHASHI and Wataru HIGASA: The Automatic Reference Service System in Kyoto University Library. JOHO KANRI, Vol. 47, No. 1, pp. 184-189, 2001.

[Nonpatent Document 13] Masao NAGASAWA: JOHO TO BUNKEN NO KENSAKU, the third Version. Maruzen Co., Ltd., 1994.

[Nonpatent Document 14] Yui KUNIYASU, Yoji KIYOTA and Teruyuki AYABE: For the Realization of an Automatic Reference Service System: A Reference Service Business Analysis on Tokyo University Library. Presentation Outline of the 54th Research Conference of Japan Library Information Academy, pp. 101-104, 2006.

DISCLOSURE OF THE INVENTION

Problems to be Solved by the Invention

In view of the above problems, the inventors have been dedicated to the research for realizing a system capable of automatically carrying out the reference answering which is conventionally performed by the librarians, and come to specifically establishing a reference service system.

As described above, an object of the present invention is to provide a dialogical information search system by comprehensively utilizing different kinds of ontologies: a library classification system and a Wikipedia category.

Means for Solving the Problems

The present invention has realized a new information search infrastructure by, as a basic way of thinking, comprehensively utilizing different kinds of ontologies: a library classification system and a Wikipedia category.

By virtue of this, it is possible to promote to the world a new information search paradigm for deepening the search through the utilization of a library with the Web as a clue, thereby, as a result, contributing to improving literacy of the whole society, and conducing to rediscovering the significance of existence of libraries and further to realizing electronic libraries.

In particular, the present invention adopts the following configurations.

(1) In order to solve the above problems, the present invention provides an information search system for carrying out an information search based on a search request from a user, the system including: a first search means for searching a folksonomic ontology on the basis of the search request; an extraction means for extracting a concept from a library ontology in relation to an acquired concept through searching the folksonomic ontology; and a second search means for searching the library ontology by utilizing the concept extracted by the extraction means.

(2) Further, the information search system according to the description of (1), further including a pathfinder creation means for creating as a clue for the information search a pathfinder at least having a search result from the first search means and a search result from the second search means.

(3) Further, the information search system according to the description of (2), wherein the pathfinder creation means creates the pathfinder including a pathway from a keyword in the search request to the concept searched by the second search means along with the search result from the second search means.

(4) Further, the information search system according to the description of (1) or (2), wherein the extraction means includes a weighting means for applying to the each concept acquired from the folksonomic ontology a weight indicating a distance and similarity to a keyword in the search request; a derivation score calculation means for applying to a concept in the library ontology a weight most heavily weighted among the concepts in the folksonomic ontology in relation to the concept as a derivation score on the basis of the weights each applied to the concepts; and a superordinate extraction means for extracting only a predetermined number of superordinate concept(s) great in value according to the acquired derivation score.

(5) In order to solve the above problems, the present invention provides an information search method for carrying out an information search based on a search request from a user, the method including: a first search step of searching a folksonomic ontology on the basis of the search request; an extraction step of extracting a concept from a library ontology in relation to an acquired concept through searching the folksonomic ontology; and a second search step of searching the library ontology by utilizing the concept extracted in the extraction step.

(6) Further, the information search method according to the description of (5), further including a pathfinder creation step of creating as a clue for the information search a pathfinder at least having a search result from the first search step and a search result from the second search step.

(7) Further, the information search method according to the description of (6), wherein in the pathfinder creation step, the pathfinder is created to include a pathway from a keyword in the search request to the concept searched in the second search step along with the search result from the second search step.

(8) Further, the information search method according to the description of (5) or (6), wherein the extraction step includes a weighting step of applying to the each concept acquired from the folksonomic ontology a weight indicating a distance and similarity to a keyword in the search request; a derivation score calculation step of applying to a concept in the library ontology a weight most heavily weighted among the concepts in the folksonomic ontology in relation to the concept as a derivation score on the basis of the weights each applied to the concepts; and a superordinate extraction step of extracting only a predetermined number of superordinate concept(s) great in value according to the acquired derivation score.

(9) In order to solve the above problems, the present invention provides a program activating a computer as an information search system for carrying out an information search based on a search request from a user, the program setting the computer to execute: a first search procedure of searching a folksonomic ontology on the basis of the search request; an extraction procedure of extracting a concept from a library ontology in relation to an acquired concept through searching the folksonomic ontology; and a second search procedure of searching the library ontology by utilizing the concept extracted in the extraction procedure.

(10) Further, the program according to the description of (9), wherein the extraction procedure includes a weighting procedure of applying to the each concept acquired from the folksonomic ontology a weight indicating a distance and similarity to a keyword in the search request; a derivation score calculation procedure of applying to a concept in the library ontology a weight most heavily weighted among the concepts in the folksonomic ontology in relation to the concept as a derivation score on the basis of the weights each applied to the concepts; and a superordinate extraction procedure of extracting only a predetermined number of superordinate concept(s) great in value according to the acquired derivation score.

(11) In order to solve the above problems, the present invention provides an information search service provision method for carrying out an information search based on a search request from a user and providing a result to the user, the method including: a first search step of searching a folksonomic ontology on the basis of the search request; an extraction step of extracting a concept from a library ontology in relation to an acquired concept through searching the folksonomic ontology; a second search step of searching the library ontology by utilizing the concept extracted in the extraction step; a pathfinder creation step of creating as a clue for the information search a pathfinder at least having a search result from the first search step and a search result from the second search step; and a pathfinder provision step of providing the created pathfinder to the user.

(12) Further, the information search service provision method according to the description of (11), wherein in the pathfinder creation step, the pathfinder is created to include a pathway from a keyword in the search request to the concept searched in the second search step along with the search result from the second search step.

(13) Further, the information search service provision method according to the description of (11) or (12), wherein the extraction step includes a weighting step of applying to the each concept acquired from the folksonomic ontology a weight indicating a distance and similarity to a keyword in the search request; a derivation score calculation step of applying to a concept in the library ontology a weight most heavily weighted among the concepts in the folksonomic ontology in relation to the concept as a derivation score on the basis of the weights each applied to the concepts; and a superordinate extraction step of extracting only a predetermined number of superordinate concept(s) great in value according to the acquired derivation score.

In addition, in an aftermentioned embodiment of the present invention, descriptions will be made primarily of the Wikipedia ontology. This, however, only corresponds to a preferable example of the folksonomic ontology.

(14) Further, the information search system according to any one of the descriptions of (1) to (4), wherein a pyramidal ontology is utilized instead of the library ontology.

(15) Further, the information search method according to any one of the descriptions of (5) to (8), wherein a pyramidal ontology is utilized instead of the library ontology.

(16) Further, the program according to the description of (9) or (10), wherein a pyramidal ontology is utilized instead of the library ontology.

(17) Further, the service provision method according to any one of the descriptions of (11) to (13), wherein a pyramidal ontology is utilized instead of the library ontology.

In this manner, in the aftermentioned embodiment of the present invention, descriptions will be made primarily of the library ontology. However, a general pyramidal ontology may also be utilized.

Advantages

As described above, according to the present invention, it is possible to provide a system capable of searching information through dialogical operations.

Especially, according to the present invention, it is possible to provide an information search system high in accuracy and easy to utilize through the combination of two different kinds of ontologies.

BRIEF DESCRIPTION OF THE DRAWINGS

FIG. 1 is a table of comparing Wikipedia with a library classification system as an information search tool;

REFERENCE NUMERALS

Figure 2:
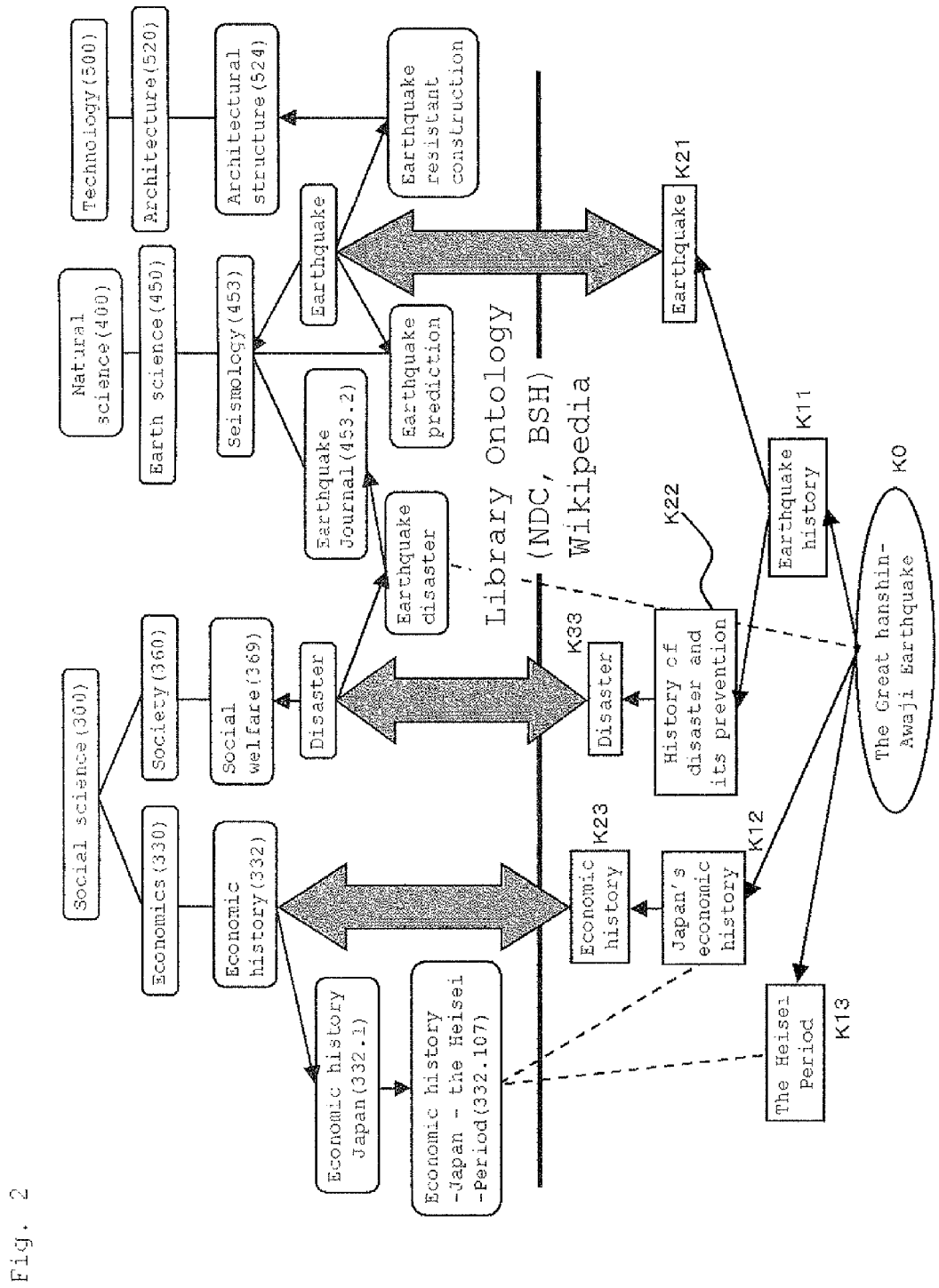
FIG. 2 is a conceptual diagram of an application example of information search when Wikipedia ontology is combined with the library ontology adopted in the present invention.
Figure 3:
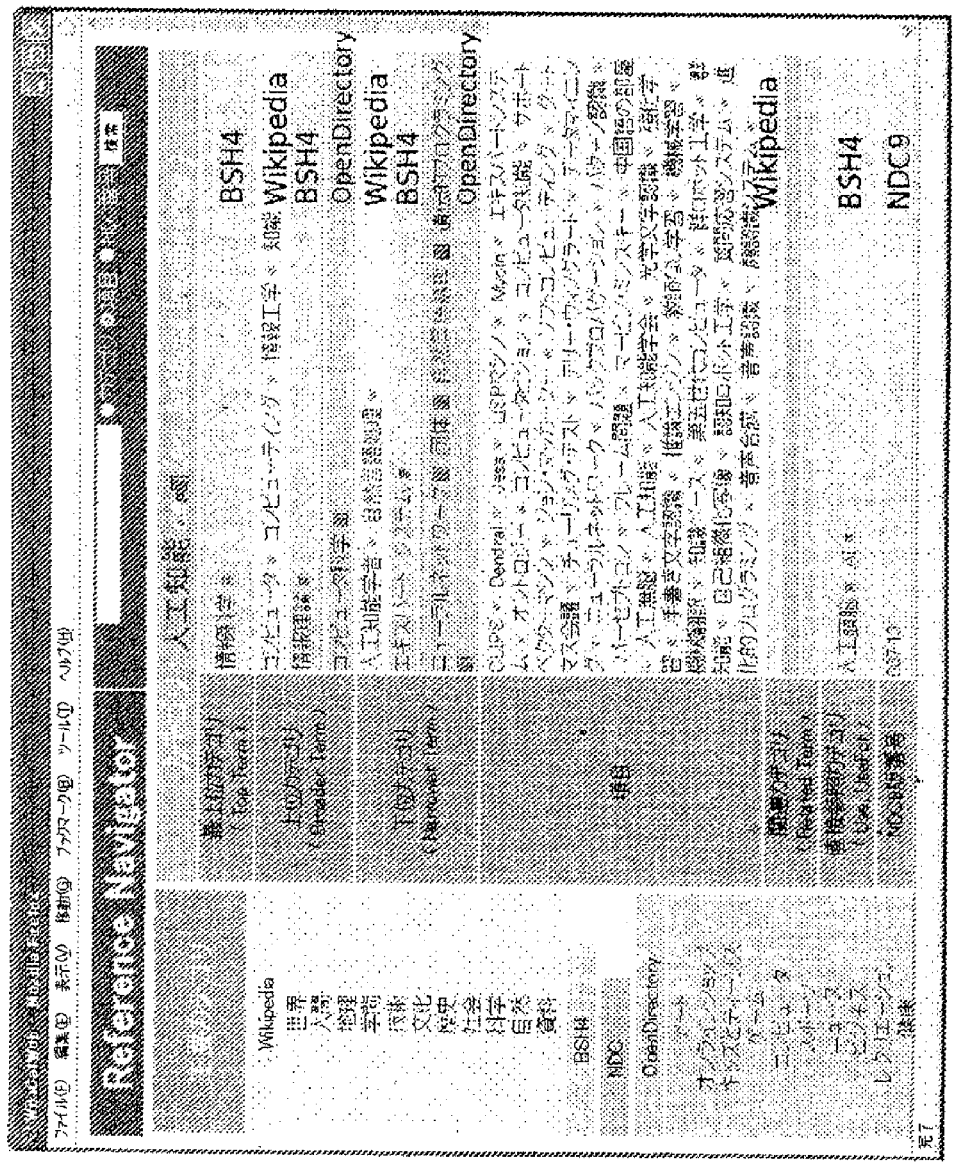
FIG. 3 shows an example of a display screen image of Reference Navigator developed by the inventors.

10 User terminal
12 Keyboard
14 Mouse
16 The Internet
18 HTTP server
20 Web application engine
22 Storage device
24 Function call processing engine
26 Associative search module
28 Session management module
30 User authentication DB
32 Log DB
34 Pathfinder creation module
36 Pathfinder creation control file
38 Question analysis module A
40 Analysis rulebook
42 Descriptive sentence analysis engine
44 Question analysis module B
46 Question analysis module C
48 Character string search module
50 External link creation module
52 External link control file
54 Search engine (1)
56 A index
58 B index
60 Search engine (1) indexer
62 Search engine (2)
64 Search engine (2) indexer
66 A index
68 B index
70 Ontology A index
72 Ontology B index
74 Ontology processing module
76 Superordinate concept automatic derivation module
78 Keyword comparison engine
80 Thesaurus
90 Central control module
92 Web document
94 Script code
96 Mouse selection processing module
98 Key entry processing module
100 History management module
102 History storage area
104 Pathfinder drawing engine
106 History drawing engine
108 Associative search drawing engine

| Reference Numerals | |
|---|---|
| 10 | User terminal |
| 12 | Keyboard |
| 14 | Mouse |
| 16 | The Internet |
| 18 | HTTP server |
| 20 | Web application engine |
| 22 | Storage device |
| 24 | Function call processing engine |
| 26 | Associative search module |
| 28 | Session management module |
| 30 | User authentication DB |
| 32 | Log DB |
| 34 | Pathfinder creation module |
| 36 | Pathfinder creation control file |
| 38 | Question analysis module A |
| 40 | Analysis rulebook |
| 42 | Descriptive sentence analysis engine |
| 44 | Question analysis module B |
| 46 | Question analysis module C |
| 48 | Character string search module |
| 50 | External link creation module |
| 52 | External link control file |
| 54 | Search engine (1) |
| 56 | A index |
| 58 | B index |
| 60 | Search engine (1) indexer |
| 62 | Search engine (2) |
| 64 | Search engine (2) indexer |
| 66 | A index |
| 68 | B index |
| 70 | Ontology A index |
| 72 | Ontology B index |
| 74 | Ontology processing module |
| 76 | Superordinate concept automatic derivation module |
| 78 | Keyword comparison engine |
| 80 | Thesaurus |
| 90 | Central control module |
| 92 | Web document |
| 94 | Script code |
| 96 | Mouse selection processing module |
| 98 | Key entry processing module |
| 100 | History management module |
| 102 | History storage area |
| 104 | Pathfinder drawing engine |
| 106 | History drawing engine |
| 108 | Associative search drawing engine |

BEST MODE FOR CARRYING OUT THE INVENTION

Hereinafter, a preferred embodiment of the present invention will be described with reference to the drawings.

1. At First

In the embodiment of the present invention, there is proposed a new information search system and information search method combining two kinds of ontologies: Wikipedia and a library classification.

First, simple descriptions will be made with respect to a library classification and the Web ontology (including Wikipedia) which are the background of the present invention.

1-1. Shelf Classification

NDC (Nihon Decimal Classification) is the most popular shelf classification for library materials in Japan. One NDC code is affixed to one material. There are various other shelf classifications known as, for example, DDC (Dewey Decimal Classification)
UDC (Universal Decimal Classification)
NDLC (National Diet Library Classification)
LCC (Library of Congress Classification)

1-2. Subject Headings

BSH (Basic Subject Headings) are the governing keywords for library materials. A plurality of subjects are affixed to one material. Further, BSH is in relation to NDC. There are various other subject headings known as, for example, LCSH (Library of Congress Subject Headings)
NDLSH (National Diet Library Subject Headings)

1-3. Folksonomy

This is a Web service which has become popular since around 2005. Flicker, del.icio.us, YouTube and the like are among the famous.

The character of folksonomy is that every user can affix a tag to the contents with his/her own point of view. Considering it as a whole system, it is found that various tags are affixed to each of the contents.

1-4. Wikipedia

This is a multilingual encyclopedia coedited on the Internet. A category as the tag is affixed to each item, thereby taking in the character of folksonomy. In addition, a category can further have a category tag affixed thereto, thereby allowing a moderate hierarchical structure to be formed. Further, a plurality of superordinate concepts can be affixed, thereby allowing multiple successions.

Especially, as has already been described, FIG. 1 shows a table of comparing Wikipedia with a library ontology.

2. Approach

The inventors consider that it may be effective to expand a library ontology with Wikipedia.

This is because it is considered that Wikipedia is most organized as a versatile Web information resource (there is a category called Wikipedia category), and thereby has a comparatively high affinity for library ontologies. Further, Wikipedia also has affinity for other information resources on the Web.

Further, library ontologies (shelf classification and subject headings) are a knowledge system which has been unremittingly accumulated by human beings for a long time, and thereby may become a powerful pointer to the information resources necessary for value judgment.

Figure 4:
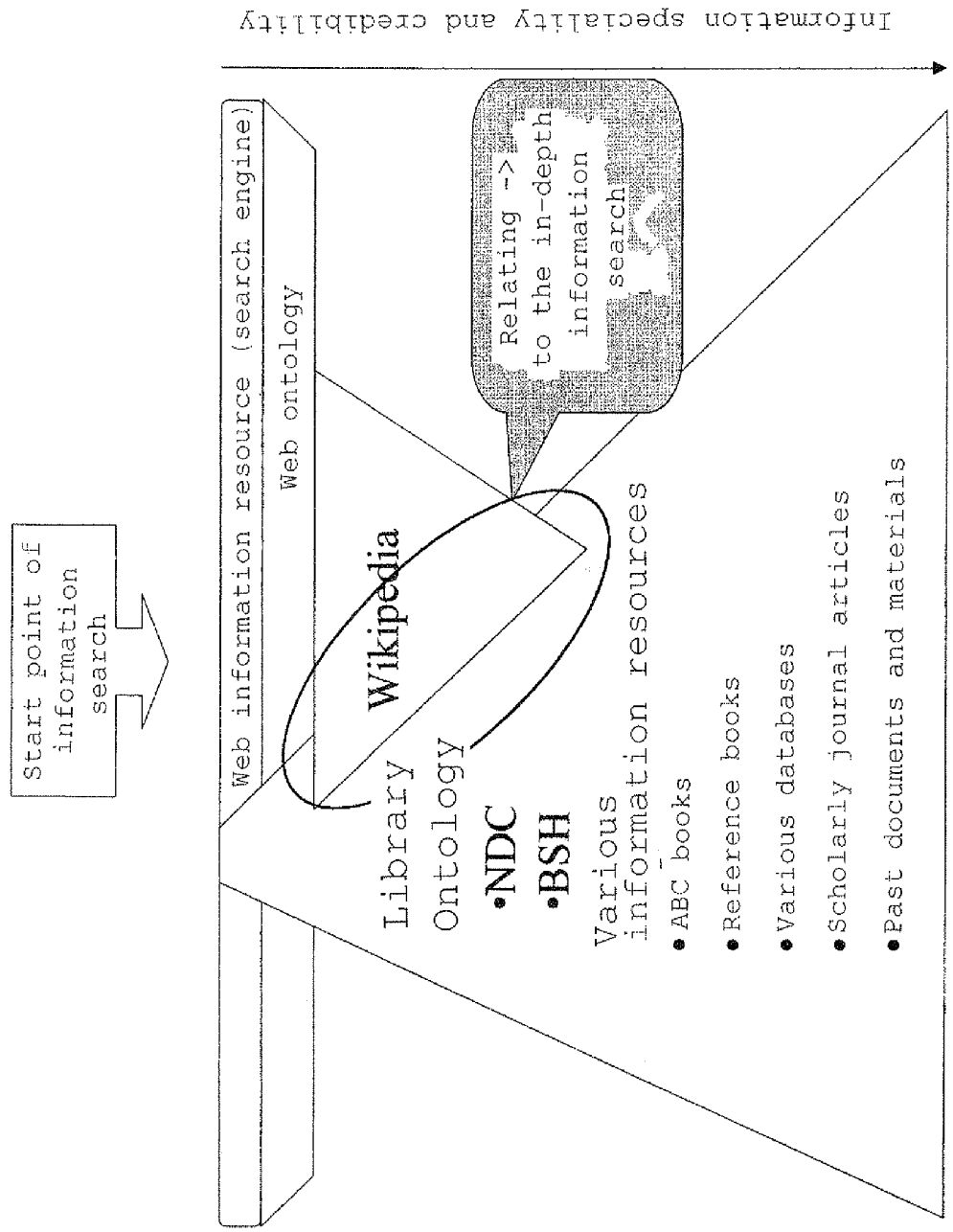
FIG. 4 is a conceptual diagram showing a relationship among library ontology, Web ontology and Wikipedia ontology.

FIG. 4 shows a conceptual diagram presenting their relationship. As shown in FIG. 4, a Web ontology excels as a start point for information search; however, it is difficult for the Web ontology alone to secure higher speciality and credibility. On the other hand, a library ontology has a low competence as a start point but, as shown in FIG. 4, is very highly adaptive for securing higher information speciality and credibility. Further, Wikipedia is a Web ontology, yet has hierarchy and systemicity to a certain extent; thereby, it can be considered as high in affinity for library ontologies. As a result, as the information search is smoothly shifted from Wikipedia to a library ontology, it is conceivable to achieve an information search system easier to utilize.

Such kind of shift is possible by utilizing a common category name to the both sides. FIG. 2 takes the Great Hanshin-Awaji Earthquake as an example of such a common category.

As shown in FIG. 2, from the Great Hanshin-Awaji Earthquake, various concepts (categories) can be reached. The result is shown in FIG. 5.

Figure 5:
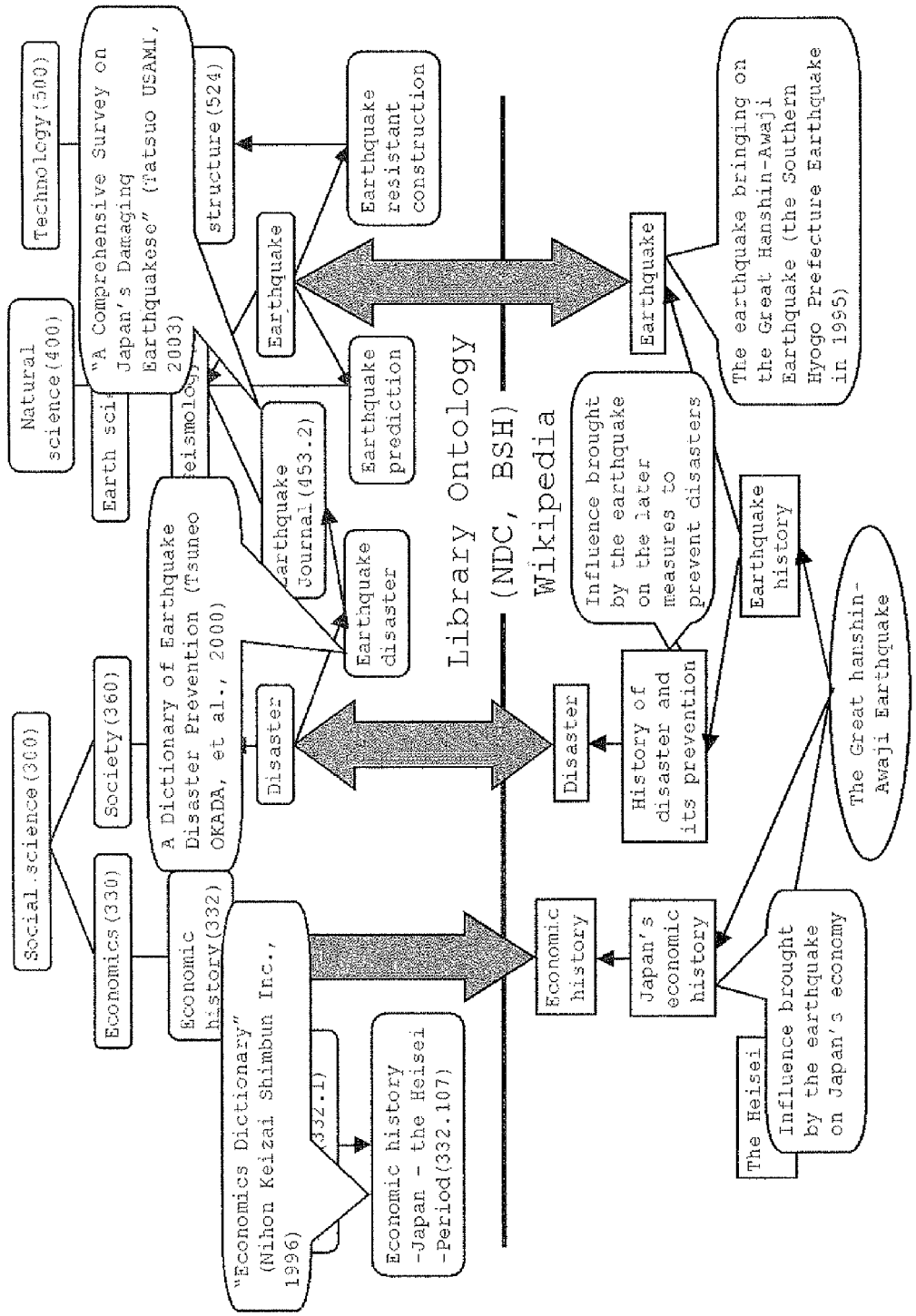
FIG. 5 is a conceptual diagram showing that starting from the keyword "the Great Hanshin-Awaji Earthquake", various concepts (categories) can be reached.

As shown in FIG. 5, in Wikipedia, reaching to "Japan's economic history" can lead to know the influence brought by the earthquake on Japan's economy. Further, "history of disaster and its prevention" can lead to know the influence brought by the earthquake on the later measures to prevent disasters. Further, "earthquake" can lead to know an earthquake which caused the earthquake (Southern Hyogo Prefecture Earthquake, 1995).

On the other hand, by shifting to the library ontology, as shown in FIG. 5, "economic history—Japan—the Heisei Period (332.107)" can lead to know the book "Economics Dictionary (Nihon Keizai Shimbun Inc., 1996). Further, the item "earthquake disaster" can lead to know "A Dictionary of Earthquake Disaster Prevention (Tsuneo OKADA, et al., 2000)". Further, "earthquake history (453.2)" can lead to read "A Comprehensive Survey on Japan's Damaging Earthquakes (Tatsuo USAMI, 2003)".

3. Reference Navigator

As described above, it is conceivable to realize an information search system easier to utilize and capable of searching the information higher in speciality by combining a library ontology and Wikipedia. Based on this conceivability, the inventors have developed a system called Reference Navigator and been able to achieve measurable results. Hereinafter, this Reference Navigator will be described.

3-1. About Similarity

The Reference Navigator makes a concept relation between Wikipedia and library ontology. Further, the relation is made not only in the case that there are matched character strings of a keyword indicating the concept, but also including the case that there is a certain similarity between two character strings.

Similarity is calculated or measured with the model which is a so-called word n-gram or a character n-gram. Herein, n is a natural number, indicating words 2-gram, words 3-gram, words 4-gram, and the like. The word n-gram is, simply speaking, a method for determining similarity when n word(s) are/is successively matched for a certain phrase which is divided into a series of words. Thus, n is, as described above, a natural number.

Further, the character n-gram is, simply speaking, a method for determining similarity as a certain phrase is divided into a group of n Japanese character(s), and similarity is determined when there is any other phrase including any of the n character(s). For example, if the character 2-gram is applied to "JI SHIN NO REKI SHI" (earthquake history), four two-character groups can be acquired: "JISHIN", "SHINNO", "NOREKI", and "REKISHI". If there is any other phrase including any of these character groups, that phrase will be determined as similar.

Further, in the Reference Navigator of the embodiment, synonyms are searched for through a thesaurus, and a synonym is also determined as similar.

3-2. Derivation of a Superordinate Concept

In order to explain the superordinate concept, hereinafter, a few of the notations will be described.

K0 represents an input keyword which is a search object. For example, in FIG. 2, "the Great Hanshin-Awaji Earthquake" is K0. In Wikipedia, a category superior to K0 can be found. As described above, Wikipedia can have a plurality of superordinate concepts, whereby generally a plurality of superordinate concepts can be found. These n superordinate concepts directly found are called primary superordinate concepts, represented by K11 . . . K1n, respectively.

That is, in the embodiment, a concept (category name) is represented by Kab, wherein "a" is a level or order representing the depth from a search object, while "b" is a serial number (that is, a running number affixed to the concept(s) existing in that level).

Now, there are three primary superordinate concepts to K0 "the Great Hanshin-Awaji Earthquake" as follows (see FIG. 2):

K11 "earthquake history";
K12 "Japan's economic history"; and
K13 "the Heisei Period".

If there are required the further superordinate concepts to K11 "earthquake history" (that is, the second-level or secondary superordinate concepts, viewed from K0), two of them are available as follows:

K21 "earthquake"; and
K22 "history of disaster and its prevention".

Further, the second-level superordinate concepts may be traced through other (the first-level) concepts such as K23 "economic history" shown in FIG. 2. Furthermore, FIG. 2 also shows a tertiary superordinate concept K31 "disaster".

3-3. Relation

When a superordinate concept is traced in this manner, as shown in FIG. 2, it can be found out that there is a concept "earthquake (453)" which completely matches K21 "earthquake" in NDC, BSH. Further, it can be found out that there is a concept which completely matches K31 "disaster" in NDC, BSH. In the same manner, it can be found out that there is a concept "economic history (332)" which completely matches K23 "economic history" in NDC, BSH (see FIG. 2).

On the other hand, "earthquake disaster" can be found in NDC, BSH as a similar concept to K0 "the Great Hanshin-Awaji Earthquake" by utilizing a thesaurus. Further, "economic history—Japan—the Heisei Period (332.107)" can be found as a similar concept to K12 "Japan's economic history", K13 "the Heisei Period" and the like by utilizing the n-gram method.

3-4. Weight

A characteristic aspect of the embodiment is to determine the display sequence, etc., according to the score which is calculated with the weights each applied to the concepts.

If W(Kmn) represents the weight of a certain concept Kmn (a concept of number n of level m), it is expressed by the following formula.

$$W(Kmn)=S(Kmn,C(Kmn))\times W(C(Kmn))$$

Herein, the calculation is made within the range: $1<m<t$; and t is a threshold value, which limits the depth of level which is a calculation object to a certain value. In addition, Kmn is also referred to as a node.

Further, $W(K0)=1.0$. This shows that the weight of the concept K0 which is a search object is set to "1".

Further, in the above formula, S( ) represents similarity, and C(Kmn) represents that which leads to Kmn among the subordinate concepts of Kmn. For example, to K23="economic history", C(K23)=K12="Japan's economic history".

That is, the above formula means:

The weight of a concept=the similarity to a subordinate concept of the concept×the weight of the subordinate concept.

Symbols will be summarized as follows.

Kmn represents a concept (node) of number n of level m;
C(K) represents a subordinate concept (node) of the concept (node) K;
S(K1, K2) represents similarity between concepts K1 and K2; and
W(K) represents the weight to concept (node) K.

3-5. Similarity

Similarity S(K1, K2) is calculated by the following formula. The similarity between concepts K1 and K2 is:

$$S(K1, K2) = 1.0 - \alpha\left(1.0 - \frac{TKC}{\sqrt{TK1} \cdot \sqrt{TK2}}\right) \quad \text{Formula One}$$

In the formula, α is a propagation parameter such as a constant 0.8 and the like.

Further, TK1 and TK2 are total numbers of the n-gram of the concepts K1 and K2.

For example, when n ~2 (i.e., 2-gram), K1 is "JISHIN", and K2 is "JI SHIN NO REKI SHI", TK1=1, for there is one word: "JISHIN"; and TK2=4, for there are four words: "JISHIN", "SHINNO", "NOREKI", and "REKISHI".

Further, TKC is the n-gram number in common. In the above example, TKC=1, for there is one concept "JISHIN" in common.

Therefore, when K1 is "JISHIN" and K2 is "JI SHIN NO REKI SHI", by:

$$S(K1, K2) = 1.0 - 0.8\left(1.0 - \frac{1}{\sqrt{1} \cdot \sqrt{4}}\right) \quad \text{Formula Two}$$
$$= 1.0 - 0.8 \times 0.5 = 0.6$$

the similarity is calculated, and the result is 0.6.

Now, the similarity S is basically a number between 0 and 1. Zero means dissimilar whereas one means similar. However, if α is less than 1, S will not be a number from 0 to 1 but, for example, from 0.2 to 1.0 (when α is 0.8).

The notations will be summarized as follows:

α is a propagation parameter;

TK is a total number of the n-gram of the concept (node) K; and

TKC is the n-gram number in common.

3-6. Derivation Score

After there is weighted each concept of the folksonomic ontology, i.e., Wikipedia as described above, based thereon, a derivation score I(Ni) is calculated for each concept Ni of the library ontology.

According to the example shown in FIG. 2, when the weight is calculated up to the third level on the Wikipedia side, "earthquake", "disaster", "economic history", and the like can be found out on the library ontology side as the completely matched concepts.

Therefore, a derivation score I is worked out with respect to these "earthquake", "disaster", and "economic history". Of course, the derivation score I can be calculated not only for completely matched concepts but also for similar concepts. The derivation score I(Ni) is calculated as follows.

$$I(Ni) = \max_{K^j \in X(Ni)} W(K^j) \quad \text{Formula Three}$$

Herein, Ni is a concept in the library ontology ("earthquake", "disaster", "economic history" and the like).

And, X(Ni) is a set of concepts in Wikipedia in relation to a concept in the library ontology. For example, Wikipedia concepts in relation to "earthquake (453)" are not limited to one but generally more than one, thereby taking the form of a set.

The concept in Wikipedia corresponds to a preferred example of the concept in the folksonomic ontology Set forth in claims of the present invention.

For example, in the example of FIG. 2, two concepts are in relation to "economic history—Japan the Heisei Period (332.108)": "Japan's economic history" and "the Heisei Period". Therefore, X("economic history—Japan—the Heisei Period (332.108)") set {"Japan's economic history", "the Heisei Period"}.

The derivation score calculated by the above formula is the weight value of the concept with the heaviest weight in the set.

Again, the notations will be summarized.

N or Ni is a concept (node) in the library ontology. Further, X(Ni) is a concept (node) or a set of concepts in Wikipedia in relation to the concept Ni.

Here, Wikipedia corresponds to a preferred example of the folksonomic ontology set forth in claims of the present invention.

3-7. Selection

Another characteristic aspect of the embodiment is to select J piece (s) of the superordinate N (library ontology entry (concept)) to output according to the value of this I(Ni) in descending order as a result of the information search. J is a predetermined natural number.

Especially, the Reference Navigator of the embodiment outputs each of the J entries along with a derivation path from K0 and the derivation score thereof.

For example, they are displayed in such a manner as:

| Entry | Path | Derivation Score |
|---|---|---|
| Earthquake (453) | <- Earthquake history: | 0.0906 |
| Economics (330) | <- Economic history <- Japan's economic history: | 0.0607 |
| Disaster (369.3) | <- Disaster <- History of disaster and its prevention <- Earthquake history: | 0.0362 |

In this manner, outputting not only derivation scores but also derivation paths leads the users to know in what connections the concepts have been output, thereby being able to establish a highly convenient information search system.

4. Configuration of The Reference Navigator

Next, descriptions will be made with respect to the configuration of the Reference Navigator which is an information search system in accordance with the embodiment of the present invention.

FIGS. 6 to 12 show configuration diagrams of the information search system (Reference Navigator). Users utilize this system with the terminal device of a configuration shown in FIG. 12 through communication lines (the Internet).

Figure 6:
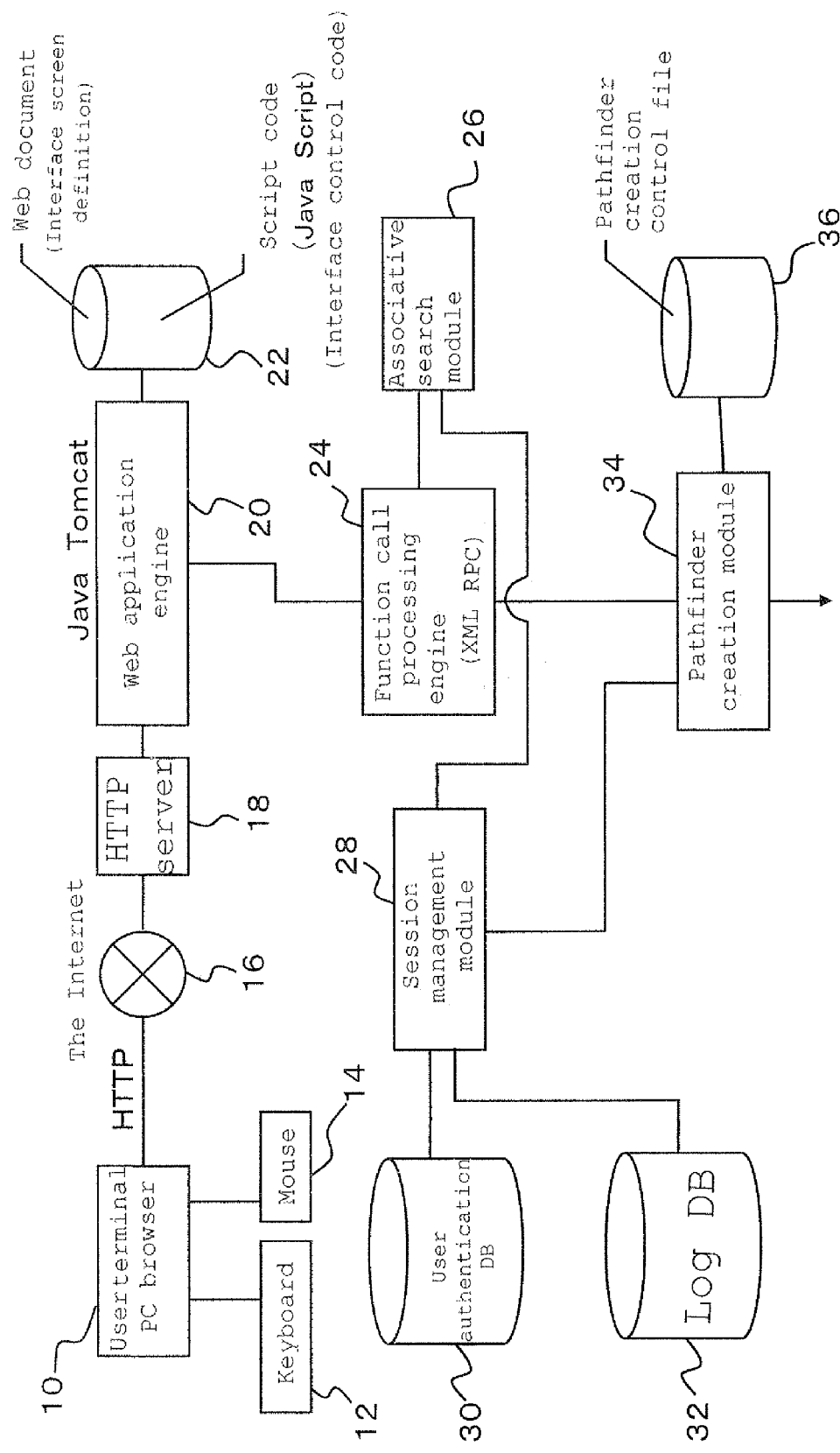
FIG. 6 is a configuration diagram of an information search system (Reference Navigator) in accordance with an embodiment of the present invention.

First, as shown in FIG. 6, a PC browser is installed in a user terminal 10. Users access the system for information searches with this browser.

To the user terminal 10, there are connected a keyboard 12, a mouse 14 and the like, with which the user operates the user terminal 10. Typically, it is preferable that a personal computer serve as the user terminal 10. However, it is also preferable that a PDA or a mobile communication terminal be utilized to serve the purpose.

To the user terminal 10, through the Internet 16 there is connected an HTTP server 18, which is controlled by a Web application engine 20.

A basic behavior of the system is described in the Web application engine 20. The inventors have applied the language Java (trademark) for the description. However, other languages are, of course, also applicable. As shown in FIG. 6, the Web application engine 20 is provided with a storage device 22 for storing Web document data (interface screen definition and the like) for use in providing the information search service, and script codes (Java Script and the like). Hard disks, semiconductor storage devices, various optical disks, and the like may be utilized for the storage device 22.

The Web application engine 20 utilizes a function call processing engine 24 to carry out an information search. This function call processing engine 24 is implemented according to XML RPC protocol; however, other protocols may also be applied. The function call processing engine 24 utilizes an associative search module 26 to carryout an associate search. The associative search module 26 carries out the associate search in cooperation with a session management module 28.

Now, the session management module 28 manages the session with the user terminal 10, and is therefore provided with a user authentication DB 30, and a log DB 32 for taking a search log.

The function call processing engine 24 and the session management module 28 provide the information necessary for a pathfinder creation module 34 to create a pathfinder.

The pathfinder creation module 34 creates a pathfinder according to the instructions from the function call processing engine 24, the session management module 28 and the like. It is provided with a pathfinder creation control file 36, and creates the pathfinder based on the contents of the control file.

To the pathfinder creation module 34, various other modules are also connected so as to carry out collaborative operations.

Figure 7:
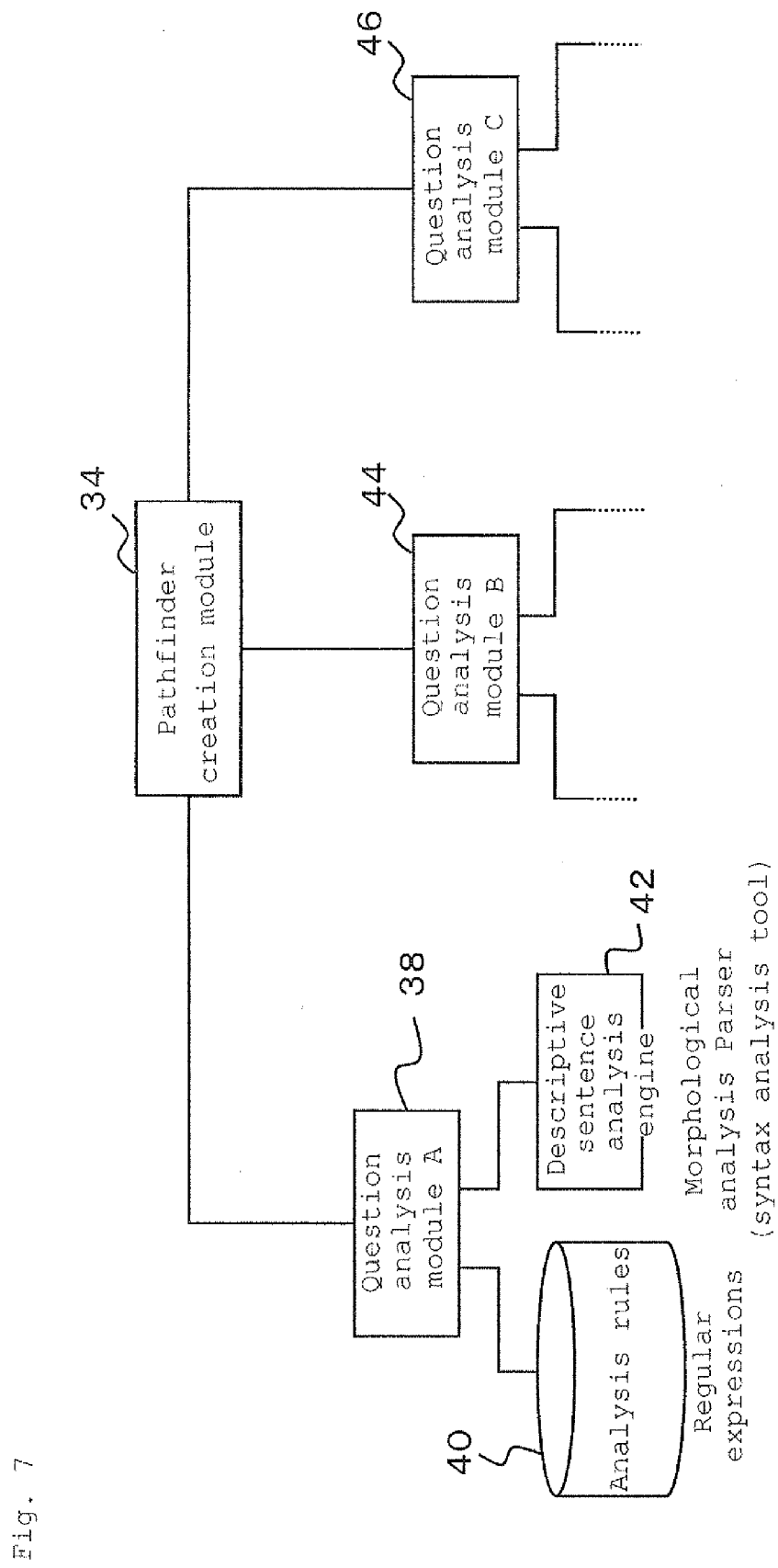
FIG. 7 is another configuration diagram of the information search system (Reference Navigator) in accordance with the embodiment of the present invention.

FIG. 7 shows other modules which are connected to the pathfinder creation module 34.

First, a question analysis module A 38 analyzes the question from the user. For the analysis, regular expressions of analysis rules are stored in an analysis rulebook 40. Further, it is provided with a descriptive sentence analysis engine 42 which carries out morphological analysis and syntax analysis (parsing) of the question described by a descriptive sentence.

There are a plurality of such question analysis modules. FIG. 7 shows a question analysis module B 44 and a question analysis module C 46 other than the question analysis module A 38.

Figure 8:
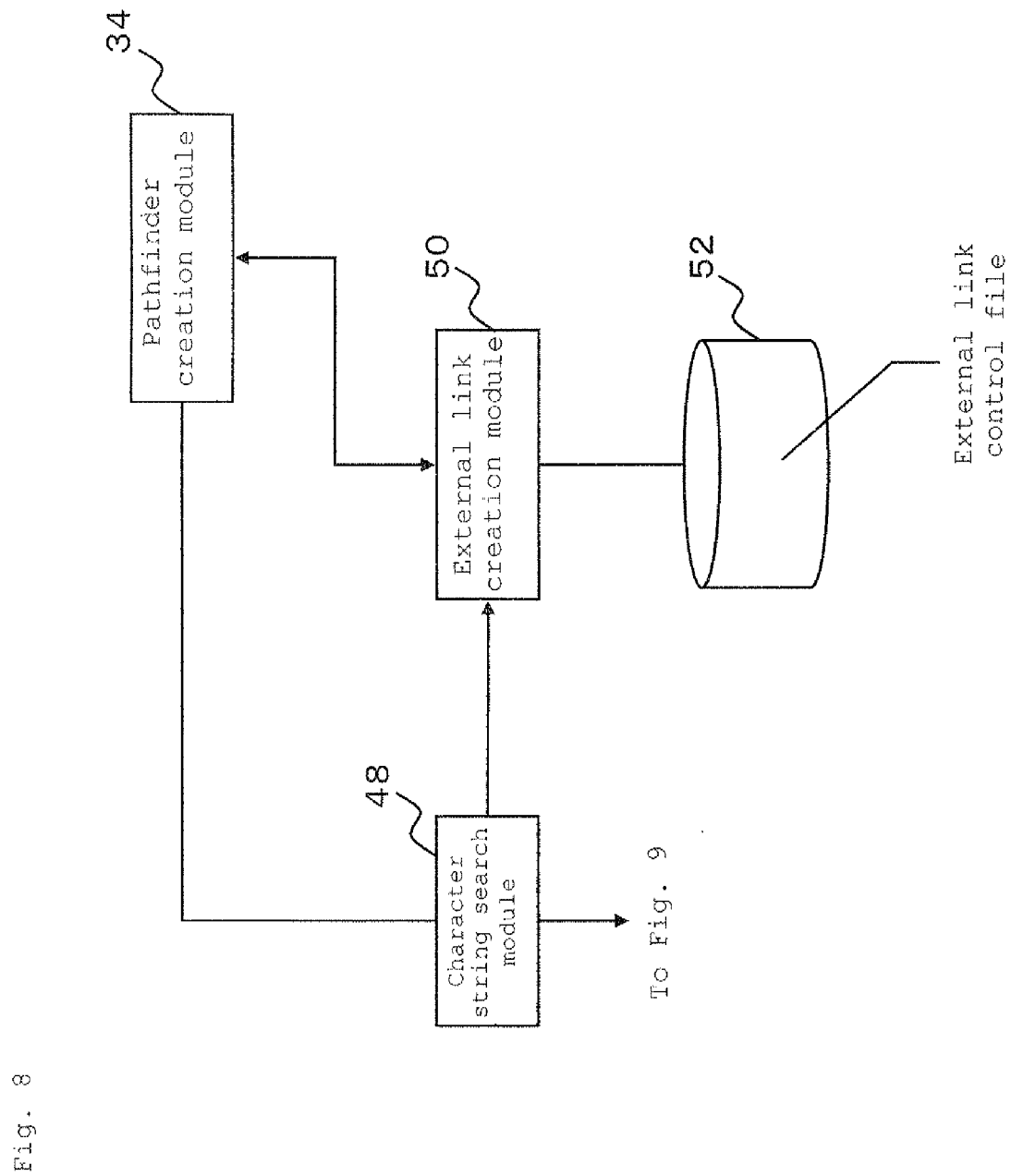
FIG. 8 is yet another configuration diagram of the information search system (Reference Navigator) in accordance with the embodiment of the present invention.

FIG. 8 also shows other modules connected to the pathfinder creation module 34. A character string search module 48 searches a predetermined character string which is a search object. An external link creation module 50 creates an external link for implanting the link into the predetermined character string. This link is provided on a pathfinder display screen which will be described hereinbelow. Further, the external link creation module 50 is provided with a storage means 52 of the control file utilized for the external link.

Figure 9:
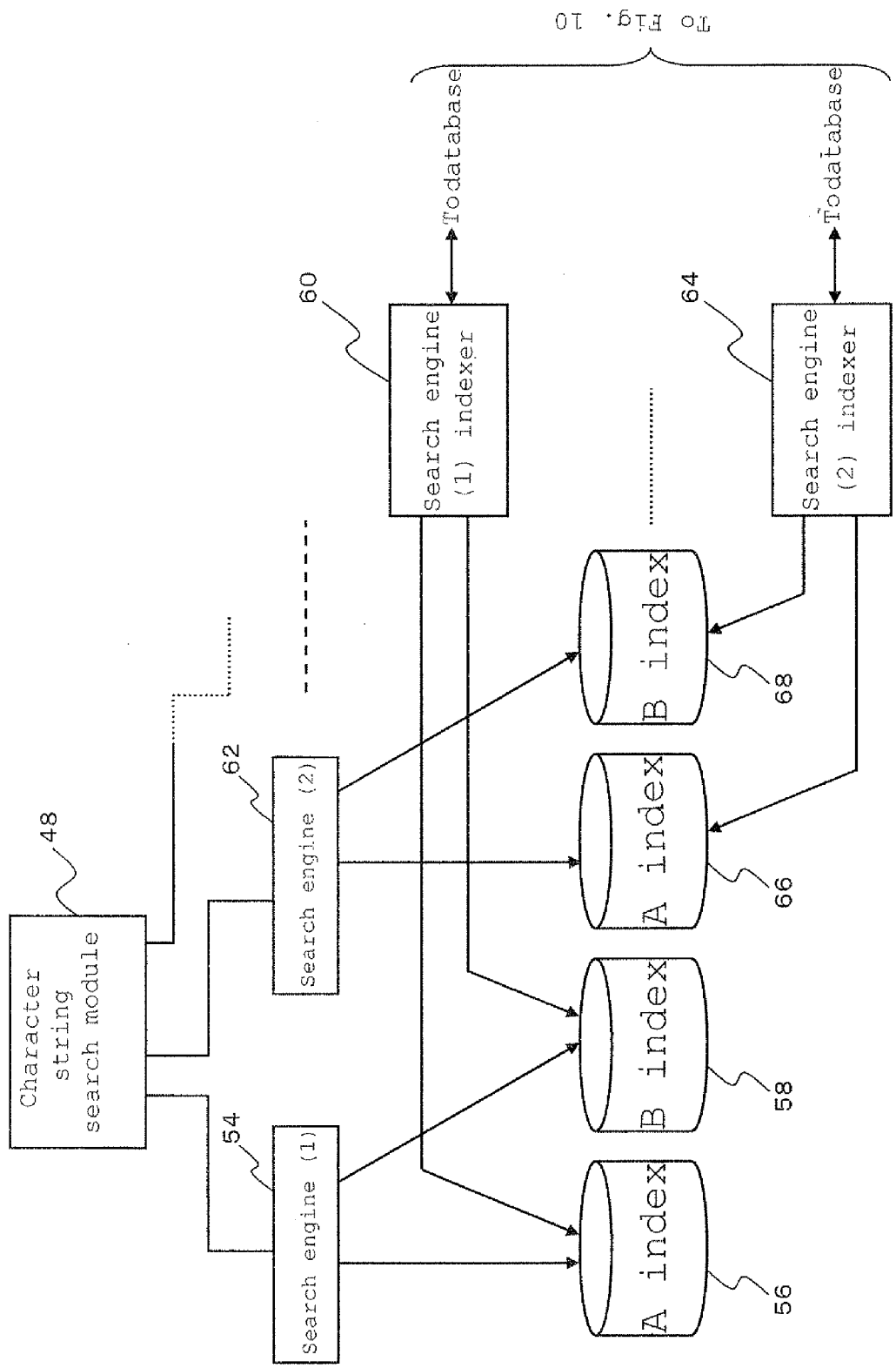
FIG. 9 is yet another configuration diagram of the information search system (Reference Navigator) in accordance with the embodiment of the present invention.

FIG. 9 shows various means in charge of different search behaviors along with the character string search module 48 of FIG. 8. The character string search module 48 is provided with a search engine (1) 54 for performing an actual search behavior. This search engine (1) 54 searches an A index 56 and a B index 58. The A index 56 is formed from the database of ontology A by a search engine (1) indexer 60 for the search engine (1) 54. In the same manner, the B index 58 is formed from the database of ontology B also by the search engine (1) indexer 60 for the search engine (1) 54.

A plurality of search engines can be provided to the character string search module 48. FIG. 9 shows a search engine (2) 62. This search engine (2) 62 is also provided with a search engine (2) indexer 64 which forms an A index 66 from the database of ontology A, and a B index 68 from the database of ontology B. Further, the search engine (2) 62 searches the A index 66 and the B index 68.

Here, ontology A represents Wikipedia, while ontology B represents the library ontology.

Figure 10:
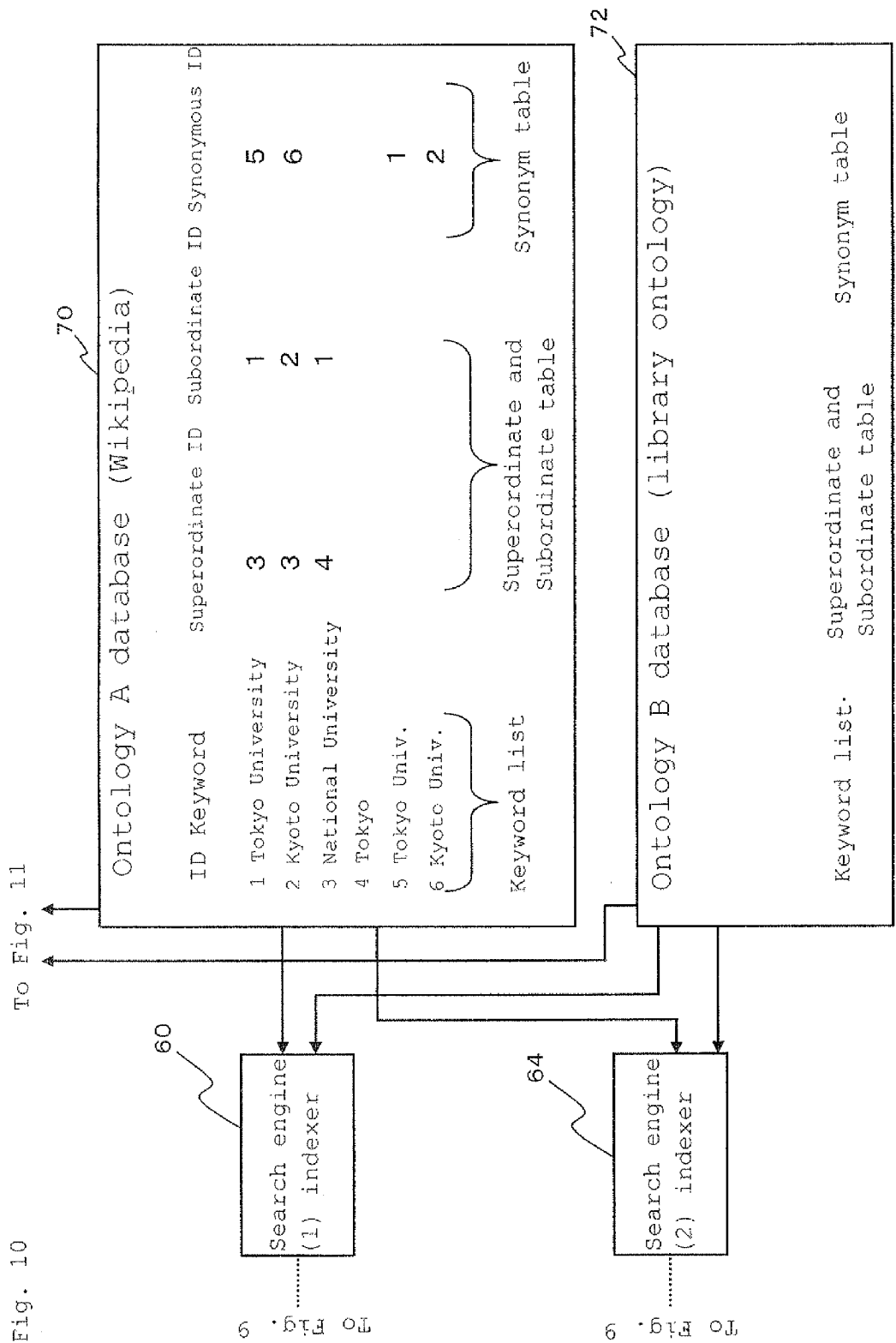
FIG. 10 is yet another configuration diagram of the information search system (Reference Navigator) in accordance with the embodiment of the present invention.

FIG. 10 shows the details of the aforementioned databases. The search engine (1) indexer 60 creates in the aforementioned manner the A index 56 and the B index 58 on the basis of an ontology A database 70 and an ontology B database 72. In the same manner, the search engine (2) indexer 64 creates in the aforementioned manner the A index 66 and the B index 68 on the basis of the ontology A database 70 and the ontology B database 72.

The ontology A database 70 is a database of the Wikipedia ontology and, as shown in FIG. 10, has a keyword list of IDs and keywords. Further, the ontology A database 70 also has a superordinate and subordinate table including a superordinate concept ID and a subordinate concept ID against each keyword. In this superordinate and subordinate table, "3" is shown, for example, as the superordinate concept to "Tokyo University". The keyword of this ID 3 is "national university". That is, "national university" is the superordinate concept to "Tokyo University".

Further, "4" is shown as the superordinate concept to "national university". The keyword of this ID 4 is "Tokyo". That is, "Tokyo" is the superordinate concept to "national university". Further, "1" is shown as the subordinate concept to "national university". The keyword of this ID 1 is "Tokyo University". That is, "Tokyo University" is the subordinate concept to "national university".

Further, the ontology A database 70 has a synonym table showing a synonymous concept ID against each keyword. For example, "5" is shown as the synonym of "Tokyo University". The keyword of this ID 5 is "Tokyo Univ.". That is, the synonym of "Tokyo University" is "Tokyo Univ.".

In this manner, the ontology A database 70 is composed of the various tables as described above. Further, the ontology B database 72 is different from the ontology A database 70 in the aspect that it is a library ontology database, but almost the same as the ontology A database 70 in other aspects or configurations.

That is, the ontology B database 72 also has, in the same manner as the ontology A database 70, a keyword list, a superordinate and subordinate table, a synonym table, and the like.

Figure 11:
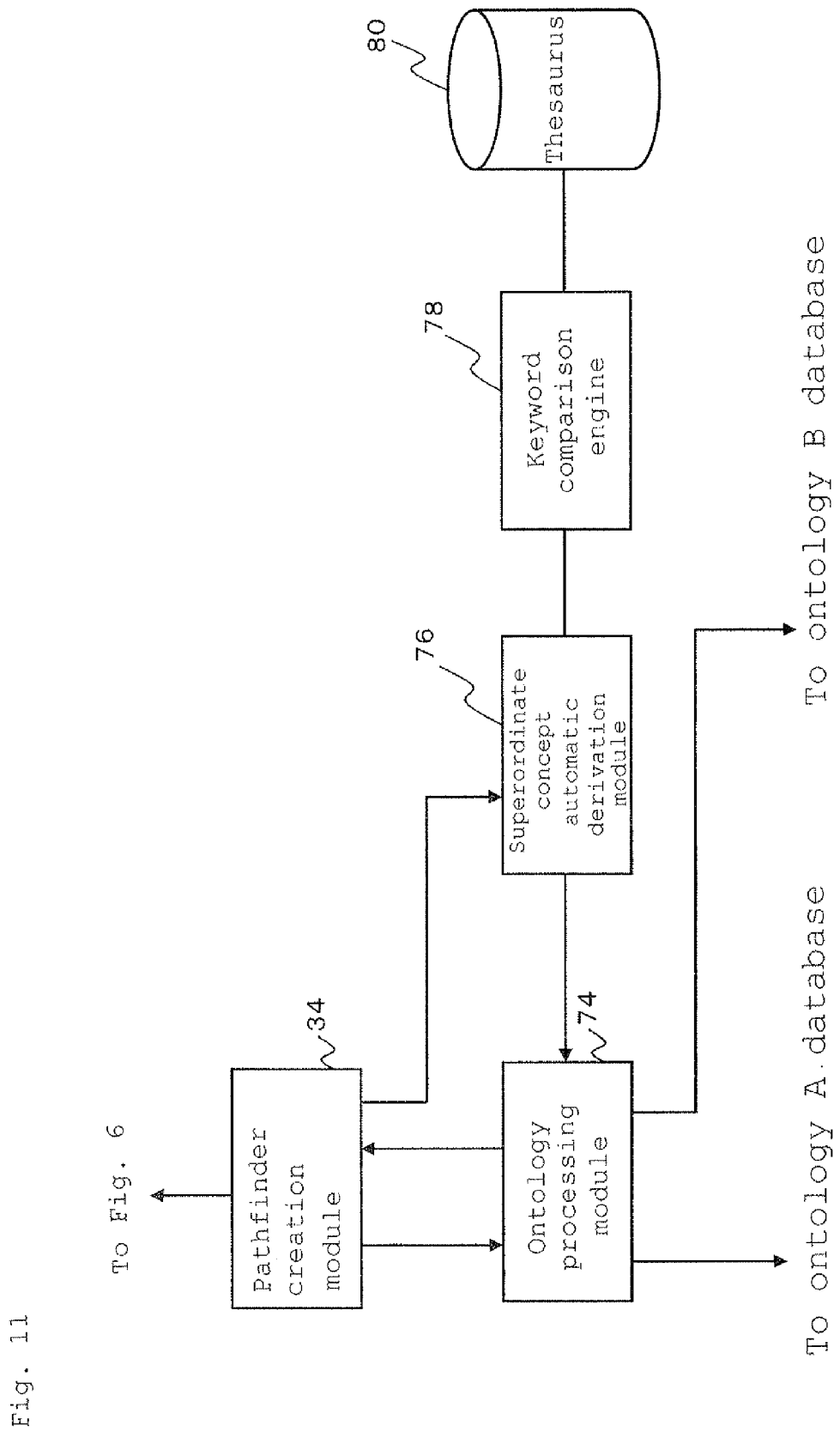
FIG. 11 is yet another configuration diagram of the information search system (Reference Navigator) in accordance with the embodiment of the present invention.

FIG. 11 shows the modules in connection with the aforementioned pathfinder creation module 34, ontology A database 70 and ontology B database 72.

First, an ontology processing module 74 carries out an ontology process with respect to the ontology A database 70 and ontology B database 72 according to the instruction from the pathfinder creation module 34. At the moment, a superordinate concept automatic derivation module 76 derives a superordinate concept according to the instruction from the pathfinder creation module 34, and then supplies it to the ontology processing module 74. The superordinate concept derivation module 76 utilizes a keyword comparison engine 78 to derive the superordinate concept. The keyword comparison engine 78 has a thesaurus 80, and carries out a comparison between the keywords not only by means of the n-gram, as has already been described, but also by taking the synonym into account.

5. Configuration of The User Terminal

Figure 12:
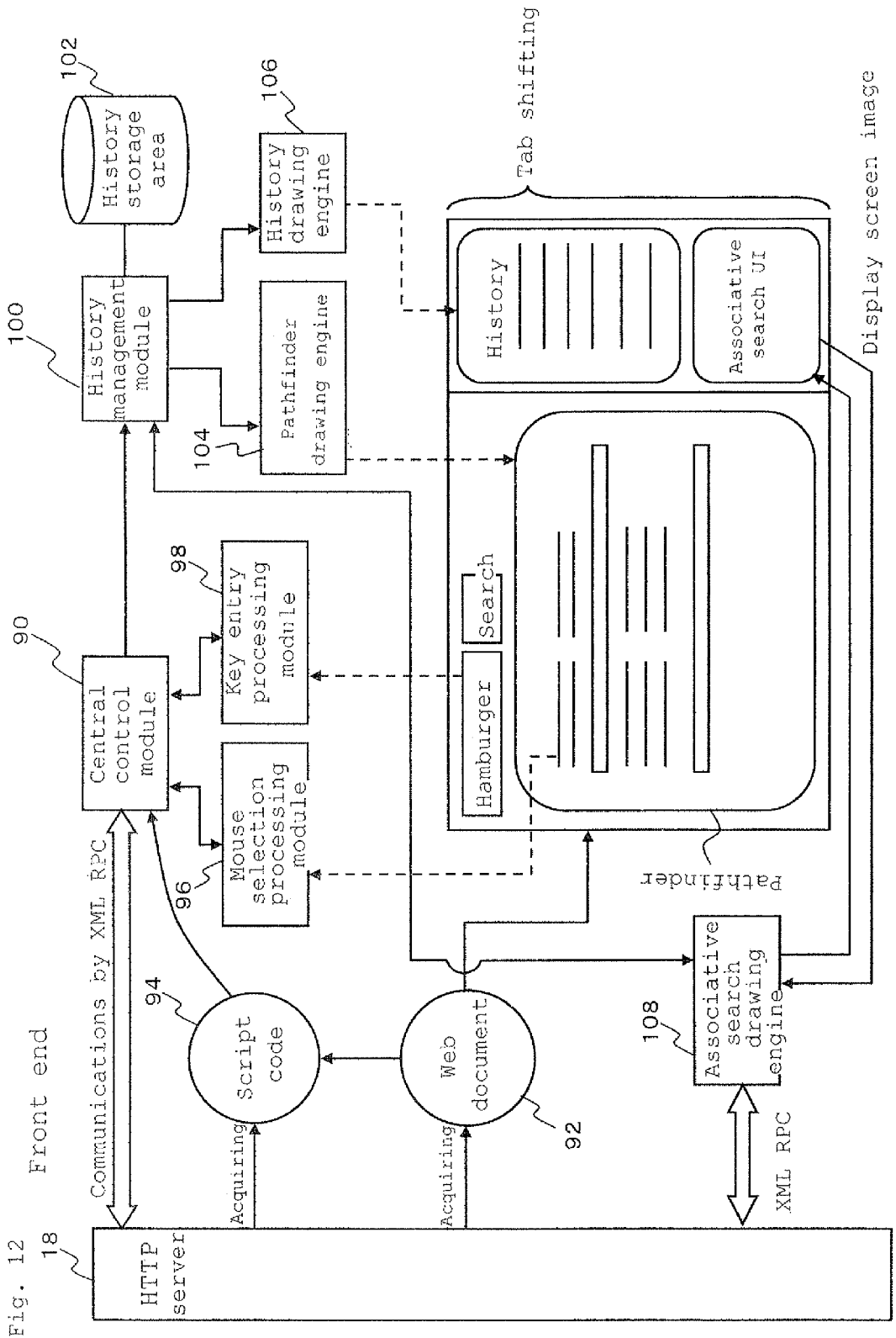
FIG. 12 is yet another configuration diagram of the information search system (Reference Navigator), in particular, a configuration diagram of a user terminal in accordance with the embodiment of the present invention.

FIG. 12 shows a configuration block diagram of the user terminal 10.

First, a central control module 90 communicates with the HTTP server 18 through the Internet 16. The central control module 90 takes out and displays a Web document 92. At the same time, it takes out and executes a script code 94.

The central control module 90 controls a mouse selection processing module 96, monitors and inputs the user's mouse operation (for example, a keyword selection operation and the like), and carries out a predetermined process. Further, the central control module 90 controls a key entry processing module 98, monitors and inputs the user's key entry operation (for example, a keyword entry "hamburger" and the like), and carries out a predetermined process.

Further, the central control module 90 has a history management module 100 for storing the history of the information search results.

Another characteristic aspect of the embodiment is the capability of displaying this history in an appropriate manner according to the user's selection. Thereby, it is easy for the user to utilize the past information search result. The history management module 100 has a history storage area 102 for storing the history.

The history management module 100 utilizes the information search history to create the pathfinder. Since the pathfinder comes up as the various search results, it is created by displaying the history. A pathfinder drawing engine 104 actually draws the pathfinder on the display screen (see FIG. 12). FIG. 12 not only is a configuration block diagram of the user terminal 10 but also schematically shows an outline of the appearance displayed on the terminal screen. In this manner, the pathfinder occupies a section of the display screen (often referred to as a "pane"). The history management module 100 displays the history of the information search results as a "history" separated from the pathfinder. A history drawing engine 106 actually draws the history on the display screen (see FIG. 12). FIG. 12 shows an example configured to be able to display various pieces of information on the right portion of the display screen through tab shifting. In the example of FIG. 12, the history and an associative search U.I. are displayed. However, it is also preferable to display other information through tab shifting.

Further, in the embodiment, the user terminal 10 has an associative search drawing engine 108. When the associative search drawing engine 108 communicates with the HTTP server 18 according to XML RPC, and acquires a result of the associative search, the result is displayed on the portion for the associative search U.I. (see the lower right portion of the display screen image of FIG. 12).

By virtue of the configuration as above, the user can utilize the Reference Navigator in accordance with the embodiment.

6. Information Search Behavior and Pathfinder Creation Behavior

Hereinafter, there will be described an information search behavior and an associated pathfinder creation behavior on the basis of a flow chart.

Figure 13:
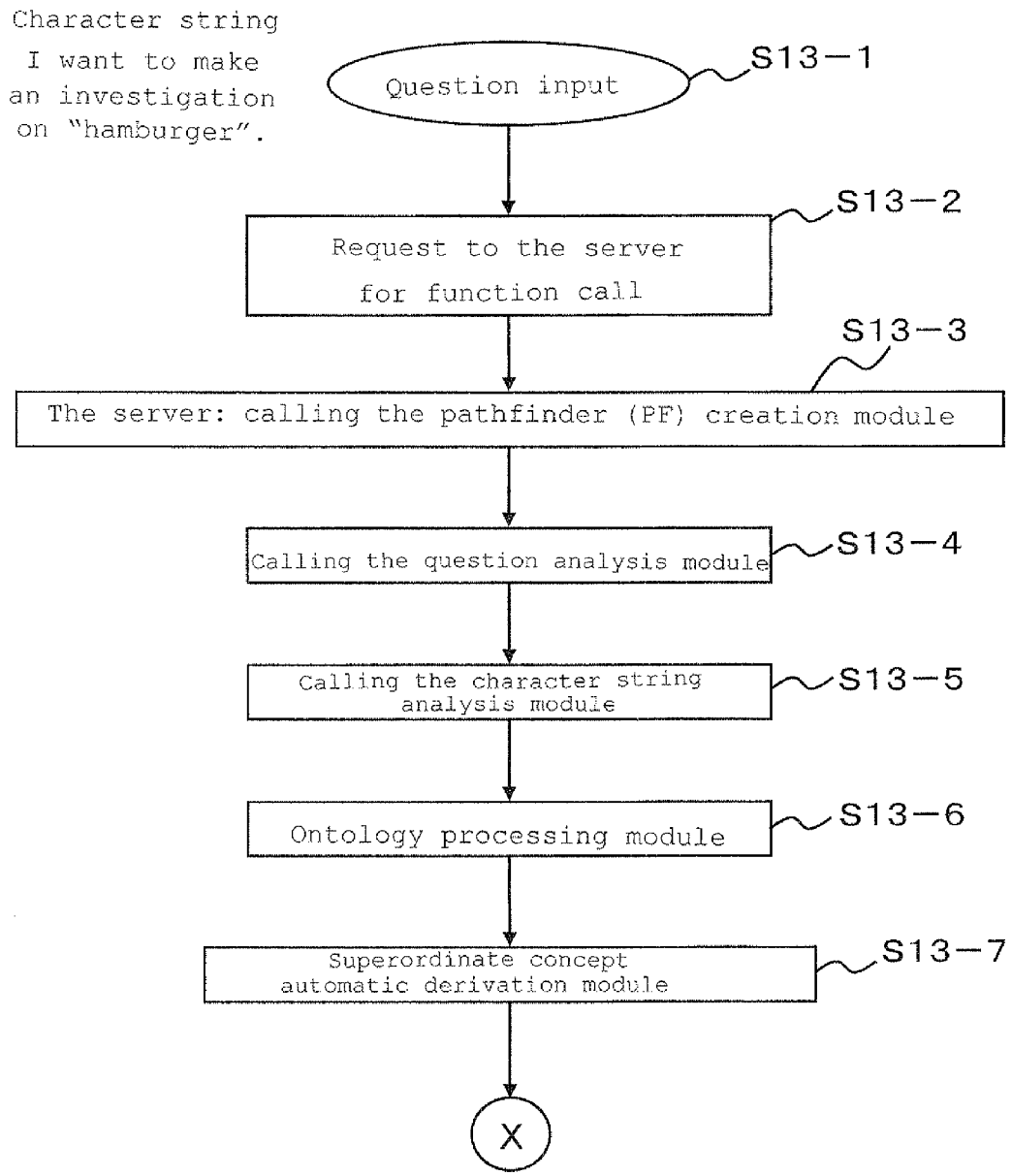
FIG. 13 is a flowchart showing an information search behavior and a pathfinder creation behavior in accordance with the embodiment of the present invention.
Figure 14:
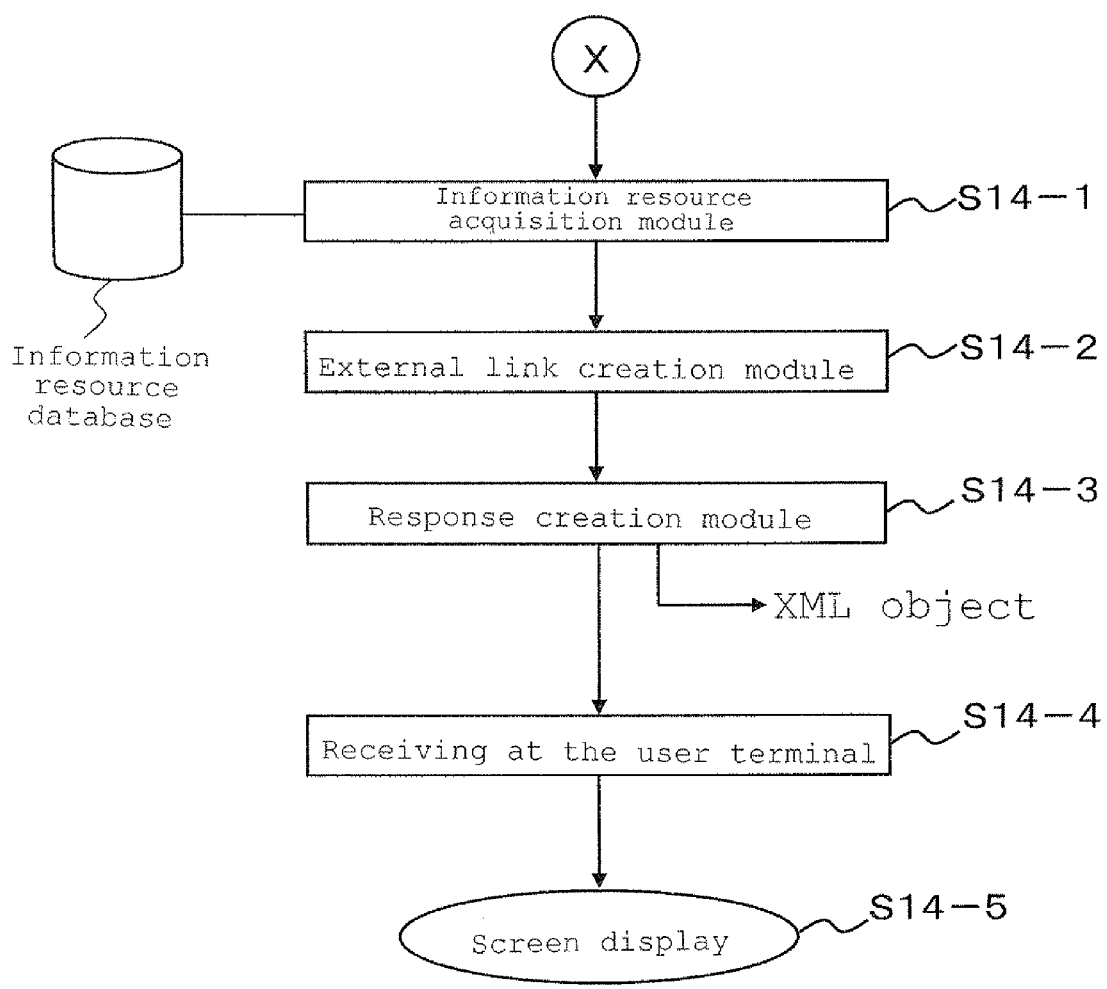
FIG. 14 is a flow chart succeeding FIG. 13 showing the information search behavior and the pathfinder creation behavior in accordance with the embodiment of the present invention.

FIGS. 13 and 14 show flow charts illustrating an information search behavior and a pathfinder creation behavior. Here in this section, descriptions are made of the behavior when a question is input through a keyboard. In the following section, descriptions will be made of the behavior when a predetermined keyword is clicked with a mouse.

First, in the step S13-1 of FIG. 13, the user inputs a descriptive sentence: "I want to make an investigation on hamburgers" through the user terminal 10.

In the step S13-2, the central control module 90 acquires the question according to the above descriptive sentence through the key entry processing module 98, and makes a request to the server for a function call with respect to the question.

In the step S13-3, the Web application engine 20 supplies the question received by the HTTP server 18 to the function call processing engine 24. The function call processing engine 24 calls the pathfinder creation module 34 on the basis of the question. As a result, the pathfinder object (hereinafter, it is also called PFobject) becomes a question: "Q: I want to make an investigation on hamburgers".

In the step S13-4, the question analysis module A 38 starts to operate, and takes out an X: hamburger from the PFobject "Q: I want to make an investigation on hamburgers".

Next, in the step S13-5, the question "Q: I want to make an investigation on hamburgers" and the X: hamburger are supplied to the character string search module 48 for the character string search. As a result, the PFobject becomes:

Q: I want to make an investigation on hamburgers.
X: Hamburger.
L: 1: Hamburger 100.0% (relationship; the same hereinbelow)
 2: Hamburger Bishop 0.4%
 3: Hamburger chain 0.3%
 4: Number Girl 0.2%
R: Hamburger.

Next, in the step S13-6, the pathfinder creation module 34 calls the ontology processing module 74 to carry out the ontology process. As a result, the PFobject becomes:

Q: I want to make an investigation on hamburgers.
X: Hamburger.
L: 1: Hamburger 100.0% (relationship; the same hereinbelow)
 2: Hamburger Bishop 0.4%
 3: Hamburger chain 0.3%
 4: Number Girl 0.2%
R: Hamburger.
BT: Bread and fast food.
NT: Mos Burger, McDonald's, etc.
RT: Sasebo Burger, food service, etc.

Herein, ET represents the superordinate word or phrase, while NT represents the subordinate word or phrase. Further, RT represents the relational word or phrase.

Next, in the step S13-7, the pathfinder creation module 34 calls the superordinate concept automatic derivation module 76 to derive the superordinate concept. As a result, the PFobject becomes:

Q: I want to make an investigation on hamburgers.
X: Hamburger.
L: 1: Hamburger 100.0% (relationship; the same hereinbelow)
 2: Hamburger Bishop 0.4%
 3: Hamburger chain 0.3%
 4: Number Girl 0.2%
R: Hamburger.
BT: Bread and fast food.
NT: Mos Burger, McDonald's, etc.
RT: Sasebo Burger, food service, etc.
BTI: Bread (588.32), food (588), restaurant (637.97), fast food, etc.

Herein, BTI represents a list of the expanded superordinate words or phrases.

Another characteristic aspect of the embodiment is to take out the library ontology concept from the Wikipedia ontology in deriving the superordinate concept. By virtue of such a behavior, it is possible to combine the Wikipedia ontology and the library ontology, thereby being able to acquire an information search system easy to access the information which is deeper in knowledge and higher in speciality.

At this stage, as has already been described, each concept (node) is weighted for obtaining the similar concept and the superordinate concept on the basis of the weight. Further, as has already been described, at this stage, a thesaurus and the like are added in for taking out the related concept so as to make the relation.

Such a process facilitates the combination of the Wikipedia ontology and the library ontology, thereby allowing the provision of a highly convenient information search system.

Next, turning to FIG. 14, in the step S14-1, the pathfinder creation module 34 calls an information resource acquisition module (not shown) to acquire various kinds of other information resources such as Tokyo University OPAC, Google, Amazon, JapanKnowledge, and the like. If the pathfinder also includes such external links, a highly convenient pathfinder can be acquired.

Next, in the step S14-2, the external link creation module 50 creates the external link on the basis of the other information resources found out in the step S14-1.

As a result, the PFobject becomes:
Q: I want to make an investigation on hamburgers.
X: Hamburger.
L: 1: Hamburger 100.0% (relationship; the same hereinbelow)
  2: Hamburger Bishop 0.4%
  3: Hamburger chain 0.3%
  4: Number Girl 0.2%
R: Hamburger.
BT: Bread and fast food.
NT: Mos Burger, McDonald's, etc.
RT: Sasebo Burger, food service, etc.
BTI: Bread (588.32), food (588), restaurant (637.97), fast food, etc.
INFON: Ministry of Agriculture, Forestry and Fisheries of Japan (http://www.maff.go.jp).
  : Food Service Industry Comprehensive Investigation and Research Center (http://www.gaishokusoken.jp/).
  : Japan Food Service Association (http://www.jfnet.or.jp).
INFOB: Food Service Industry Statistic Materials (ISBN: 9784906357192 (4906357199)).
  : Food Service Industry Marketing Handbook (ISBN: unknown).
EXTL: Tokyo University OPAC (https://opac.dl.itc.u-tokyo.ac.jp/).
  : Google (http://www.google.co.jp).
  : Amazon (http://www.amazon.co.jp).

Next, in the step S14-3, the pathfinder creation module 34 makes a response creation module (not shown) create a response and send the above PFobject to the user terminal 10.

The response created here is an XML object. In particular, in order to make an investigation on hamburgers, such data are created as:
  (a) To search for books of the library: NDC 588.32 (bread) and 588 (food);
  (b) To investigate in a wider range: bread, food, restaurant and fast food;
  (c) To investigate in a limited range: Mos Burger and McDonald's;
  (d) To investigate related items: Sasebo Burger and food service industry;
  (e) To investigate similar items: Hamburger Bishop, hamburger chain and Number Girl; and
  (f) To search external resources: OPAC, Google and Amazon.

Among the above data, (a) is created by utilizing BTI library classification and (b) is created by utilizing BTI. Further, (c) utilizes NT, (d) utilizes RT, (e) utilizes L, and (f) utilizes EXTL to create the respective data.

The created XML data (the response) is sent back to the user terminal 10.

Next, in the step S14-4, the central control module 90 of the user terminal 10 receives the response and displays its contents on the display screen. As a result, the user can see the pathfinder display as shown in FIG. 12. Further, as has already been described, since the user terminal 10 has the history management module 100, it is possible to appropriately call out the past pathfinder for browsing, thereby realizing an information search service easy for the users to utilize.

7. Information Search Behavior and Pathfinder Creation Behavior (In The Case of Mouse Click)

In the above section 6, descriptions were made of the behavior in the case that the question was input through a keyboard on the basis of the flow charts. Here in the section 7, descriptions are made of the information search behavior and the associated pathfinder creation behavior when the user clicks a predetermined keyword with a mouse on the basis of another flow chart.

Figure 15:
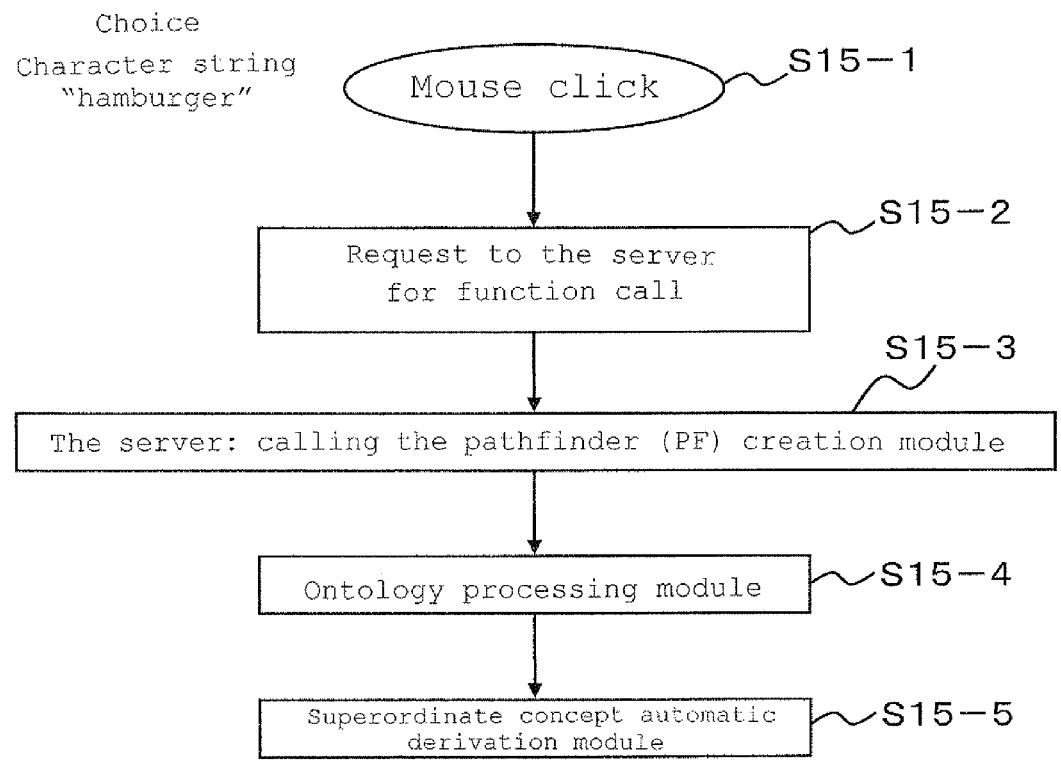
FIG. 15 is a flow chart showing another information search behavior and an associated pathfinder creation behavior when a predetermined keyword is clicked with a mouse.

FIG. 15 shows the flow chart illustrating the information search behavior and the associated pathfinder creation behavior when the user clicks a predetermined keyword with a mouse. Here, the descriptions are made of the case that the predetermined keyword "hamburger" is clicked through a mouse.

First, in the step S15-1 of FIG. 15, the user clicks the keyword "hamburger" on the display screen of the user terminal 10.

In the step S15-2, the central control module 90 acquires the above clicked keyword through the key entry processing module 98, and makes a request to the server for a function call with respect to the keyword.

In the step S15-3, the Web application engine 20 supplies the keyword "hamburger" received by the HTTP server 18 to the function call processing engine 24. The function call processing engine 24 calls the pathfinder creation module 34 on the basis of the keyword. As a result, the pathfinder object (hereinafter, it is also called PFobject) becomes:
Q: "hamburger" is selected.
X: Hamburger.
R: Hamburger.

Next, in the step S15-4, the pathfinder creation module 34 calls the ontology processing module 74 to carry out the ontology process.

Further, the example shown in the flow chart of FIG. 15 is different from that shown in FIG. 13 (the question was input through a keyboard). Therefore, the question processing module 38, the character string search module 48 and the like are not utilized.

Next, in the step S15-5, the pathfinder creation module 34 calls the superordinate concept automatic derivation module 76 to derive the superordinate concept.

Here again, in the same manner as shown in the aforementioned FIG. 13, a characteristic aspect of the embodiment is to take out the library ontology concept from the Wikipedia ontology in deriving the superordinate concept. This aspect does not exist in the conventional information search.

Especially, by virtue of such a behavior, it is possible to combine the Wikipedia ontology and the library ontology, thereby being able to acquire an information search system easy to access the information which is deeper in knowledge and higher in speciality.

Further, as has already been described, each concept (node) is weighted in relating the concepts between the Wikipedia ontology and the library ontology. Accordingly, "relating" to the library ontology is carried out by searching out the similar concept and the superordinate concept based on this weight. Further, as also has already been described, at this stage, a thesaurus and the like are added in for taking out the related concept so as to make the relation.

Such processes facilitate the combination of the Wikipedia ontology and the library ontology, thereby allowing the provision of a highly convenient information search system.

8. Conclusion

As described above, according to the embodiment, since a combination is realized between the Wikipedia ontology and the library ontology, it is possible to carryout an information search which takes advantage of the merits on both sides and is thereby easy to utilize.

Especially, along with the search behavior, a pathfinder is automatically created, whereby it is possible to establish a highly convenient information search system.

9. Wikipedia and Folksonomy

Up to the present, descriptions have been made of the combination of the Wikipedia ontology and the library ontology. However, the Wikipedia ontology can be referred to as, more generally speaking, a folksonomy ontology.

Here is a quotation from "imidas" (Shueisha, Inc.) as follows.

Folksonomy refers to 'The users collect and classify the Internet contents in the way they prefer. It is a coined word by putting together "folk" and "taxonomy". The conventional information classification on the Internet is on the provider side with a hierarchical structure, represented by directory search engines. On the other hand, folksonomy allows the users per se to add on index information which is called a tag, and thus to classify and organize the information. The photograph sharing service "Flicker" on the network and the social bookmark service "del.icio.us" are representative services utilizing folksonomy. The former allows a photograph register (the person who has uploaded a photograph) to freely affix a tag as the keyword so as to make connections with the fellow users through photographs. The latter allows the bookmarks to be tagged and shared such that it becomes easy to search out beneficial information from the bookmarks of a same orientation' (End of the quotation).

The ontology in such folksonomy is called a folksonomic ontology. The aforementioned Wikipedia ontology can be positioned or regarded as an example of the folksonomic ontology. Therefore, the present invention can be, generally, realized by utilizing the folksonomic ontology.

10. Programs and Computer

Now, in the embodiment, FIGS. 6 to 12 have been utilized to describe the system configuration. Each of the various modules, engines, indexers and the like shown therein is made up by a program. In other words, the server, the computers (the server, and the user terminal, i.e., the client) carry out the behaviors described above in FIGS. 13 to 15 and the like by executing these modules.

Hence, the system described in the embodiment includes the various programs, and various databases stored in the storage devices: the ontology A database 70, the ontology B database 72, the user authentication DB (database) and the log DB (database). It further includes various control files: the pathfinder control file 36, the external link control file 52 and the like; dictionary data: the thesaurus 80; and the like.

Herein, it is preferable to store every database and dictionary in predetermined storage means such as various hard disks, semiconductor storage devices, optical disks, and the like. They may be either provided in the vicinity of the computer or downloaded from a remote device through the network.

Further, it is also preferable to store the programs such as the various modules, engines and the like in the storage means as described above. Further, they may also be preferably stored in transportable storage means (for example, CDROM and the like). Furthermore, it is also preferable that the programs be stored in a remote server and executed in the server through the network.

11. Application Fields (1) As described above, the present invention is especially characterized, as an information search system, by combining the library ontology and the folksonomic ontology.

Therefore, it is preferred to apply the information search system in accordance with the present invention mainly in libraries and their associated facilities. Especially, according to the present invention, it is possible to efficiently search for the books by searching the concepts; hence, it is also preferred to utilize it as a system for educating library staff members, librarians and various researchers on "information search". Furthermore, it is also preferred to apply it to the education of "information search" for library users.

(2) The present invention allows the concept search to be very efficiently carried out by combining different kinds of ontologies. Therefore, it is conceivable to carry out an efficient search by leading the "concept" acquired by utilizing the information search system to an external search engine (a common search engine on the Internet).

Therefore, it is preferable to provide an external link button for the external search engine on the display screen image of the information search system. For example, if an external link button for the famous search engine Google is provided on the display screen image of the aforementioned user terminal 10, it will be convenient for the user to perform a Google search with the concept of a search result as a keyword, when the user clicks the external link button.

Further, since the external link button is conventionally configured to feed a keyword to a search engine, it is easy for those skilled in the art (persons who have ordinary knowledge in that technical field) to from such a button.

As a result, the search can be performed throughout the Internet.

(3) Up to the present, the library ontology has been described. In such ontology, only one superordinate concept is determined for a certain concept. In other words, it is possible in principle to utilize other ontologies as long as only one superordinate concept is determined as above. Such ontology is called a pyramidal ontology as there is only one superordinate concept to a certain concept in this manner.

Then, it will be possible to adopt various pyramidal ontologies according to the application fields to which they are applied. That is, the present invention is not limited to the search system in association with libraries but can be utilized for information searches in various other fields.

In a word, it is also conceivable to utilize it as a word base classification dictionary tool adopting concept classification.

For example, it can be utilized for the purpose of indexing an advertising effect and influence on the Internet. There are various publicizing and advertising media in the world. Generally; when consumers have seen what is advertised, they may write blogs or articles, or post massages on bulletin boards on the Internet. Hence, with respect to the written massages, by means of concept classification with the word bases or roots taken from the words for the advertised products, word bases can be classified. As a result, it is possible to acquire a dictionary tool with word bases lined up for each concept. This may be utilized as a feedback material to the advertiser as well as a hint keyword search tool.

A few specific examples will be given hereinafter. First, it is possible to establish an information search system capable of measuring the advertising effect on cosmetics or shampoos.

For example, suppose Company S has developed a new shampoo "Tsubame" and launched an advertising campaign for the new product on the Internet. In order to measure the advertising effect, conventionally, only rough estimation of the effect could be made on the basis of the following data acquired by searching the articles and blogs which took up "Tsubame": How many times is it taken up? How many times is it referred to on the blogs? How many comments are made on it? Etc.

Now, suppose the information search system of the present invention is applied to it. First, a pyramidal ontology can be established by the specialists for "Tsubame" targeting shampoos, cosmetics and the like.

Then, various concepts with respect to "Tsubame" are extracted and then utilized to search the articles and blogs on the Internet.

With respect to "Tsubame", associated concepts are acquired, as described above, by utilizing the information search system which combines the pyramidal ontology and the folksonomic ontology. As a result, concepts are acquired such as "Company S", "shampoo", "cosmetic" and, furthermore, shampoo "Luck" of "Company U" which is a competing product, etc.

By utilizing these concepts in searching the articles and blogs on the Internet, a high-precision search is realized. Further, since the comparison can also be made with a competitor's product ("Luck" of Company U), a more detailed investigation can be made on the advertising effect.

The invention claimed is:

1. An information search device for carrying out an information search based on a search request from a user, the device comprising:
  at least one processor;
  at least one memory, the at least one memory storing instructions that when executed cause the at least one processor to perform as:
  a first search engine for searching a folksonomic ontology database on the basis of the search request, the first search engine identifying one or more first search categories based on the search request;
  a search engine index for extracting from a library ontology one or more library categories that correspond to the first search categories;
  a second search engine, different from the first search engine, for searching the library ontology by searching within the library categories such that the device facilitates access for the user to information in a library; and
  a pathfinder creation module for creating as a clue for the information search a pathfinder having a search result from the first search engine and a search result from the second search engine,
  wherein the search engine index comprises:
  a weighting module for applying to the first search categories a weight indicating a distance and similarity to a keyword in the search request;
  a derivation score calculation module for applying to the library categories a derivation score that is based on the weight value of the first search categories that correspond to the library categories; and
  a superordinate extraction module for extracting only a predetermined number of superordinate concept(s) that have high derivation scores.

2. The device according to claim 1, wherein the pathfinder creation module creates the pathfinder comprising a pathway from a keyword in the search request to the library categories utilized by the second search engine along with the search result from the second search engine such that the pathfinder creation module is configured to use the first search engine to extract one or more broad upper concepts from the folksonomie ontology database.

3. The device according to claim 2, wherein the pathfinder creation module is configured to use the second search engine to search the library ontology such that the results from the second search engine are stored in the pathfinder creation module.

4. The device according to claim 1, wherein a pyramidal ontology is utilized instead of the library ontology.

5. The device according to claim 1, wherein the folksonomic ontology database is a wiki website.

6. The device according to claim 1, wherein the library ontology is a library classification system.

7. The device according to claim 6, wherein the library classification system is selected from the group consisting of: the Nihon Decimal Classification, the Dewey Decimal Classification, the Universal Decimal Classification, the National Diet Library Classification, and the Library of Congress Classification.

8. The device according to claim 1, wherein the weighting module calculates the similarity between concepts K1 and K2 as follows:

$$S(K1, K2) = 1.0 - \alpha\left(1.0 - \frac{TKC}{\sqrt{TK1} \cdot \sqrt{TK2}}\right)$$

where α is a propagation parameter, TK1 and TK2 are total numbers of an n-gram of the concepts K1 and K2, TKC is the n-gram number in common, the n-gram is a group of n character(s) in K1 or K2 when K1 and K2 are divided into a group of n character(s), and n is natural number.

9. The device according to claim 1, wherein the derivation score calculation module calculates the derivation score as follows:

$$I(Ni) = \max_{K \in X(Ni)} W(K^j)$$

where Ni is a concept in the library ontology, X(Ni) is a set of concepts in the folksonomic ontology database in relation to the concept in the library ontology, W( ) is a function for assigning weight to a concept, j is a predetermined natural number, and $K^j$ is a concept node.

10. The device according to claim 1, wherein the pathfinder creation module is connected to a module such that the module is configured to analyze a question from the user and the module includes (i) an analysis rulebook configured to store regular expressions of analysis rules and (ii) a descriptive sentence analysis engine configured to carry out morphological analysis and syntax analysis of the question.

11. The device according to claim 1, wherein the pathfinder creation module is connected to a character string search module configured to search a predetermined character string and an external link creation module configured to create an external link for implanting a link into the predetermined character string such that the external link creation module is provided with a storage unit for the external link.

12. The device according to claim 11, wherein the character string search module is configured to search at least one first index formed from the folksonomic ontology database and at least one second index formed from the library ontology.

13. The device according to claim 1, wherein the weighting module calculates the similarity between concepts K1 and K2 as follows:

$$S(K1, K2) = 1.0 - \alpha\left(1.0 - \frac{TKC}{\sqrt{TK1} \cdot \sqrt{TK2}}\right)$$

where $\alpha$ is a propagation parameter, TK1 and TK2 are total numbers of an n-gram of the concepts K1 and K2, TKC is the n-gram number in common, the n-gram is a group of n word(s) in K1 or K2 when K1 and K2 are divided into a group of n word(s), and n is natural number.

14. An information search method for carrying out an information search based on a search request from a user, the method comprising:
   a first search step of searching a folksonomic ontology database on the basis of the search request, and identifying one or more first search categories based on the search request;
   an extraction step of extracting from a library ontology one or more library categories that correspond to the first search categories;
   a second search step, different from the first search step, of searching the library ontology by searching within the library categories such that the method facilitates access for the user to information in a library and
   a pathfinder creation step of creating as a clue for the information search a pathfinder having a search result from the first search step and a search result from the second search step,
   wherein the extraction step comprises:
   a weighting step of applying to the first search categories a weight indicating a distance and similarity to a keyword in the search request;
   a derivation score calculation step of applying to the library categories a derivation score that is based on the weight value of the first search categories that correspond to the library categories; and
   a superordinate extraction step of extracting only a predetermined number of superordinate concept(s) that have high derivation scores.

15. The information search method according to claim 14, wherein in the pathfinder creation step, the pathfinder is created to comprise a pathway from a keyword in the search request to the library categories along with the search result from the second search step such that the pathfinder uses a result from the first search step to extract one or more broad upper concepts from the folksonomic ontology database.

16. The information search method according to claim 14, wherein a pyramidal ontology is utilized instead of the library ontology.

17. A non-transitory computer readable medium storing a program causing a computer to execute a process for carrying out an information search based on a search request from a user, the process comprising:
   a first search procedure of searching a folksonomic ontology database on the basis of the search request, the first search procedure identifying one or more first search categories based on the search request;
   an extraction procedure of extracting from a library ontology one or more library categories that correspond to the first search categories; and
   a second search procedure, different from the first search procedure, of searching the library ontology by utilizing the library categories such that the process facilitates access for the user to information in a library; and
   a pathfinder procedure of creating as a clue for the information search a pathfinder having a search result from the first search procedure and a search result from the second search procedure,
   wherein the extraction procedure comprises:
   a weighting procedure of applying to the first search categories a weight indicating a distance and similarity to a keyword in the search request;
   a derivation score calculation procedure of applying to the library categories a derivation score that is based on the weight value of the first search categories that correspond to the library categories; and
   a superordinate extraction procedure of extracting only a predetermined number of superordinate concept(s) that have high derivation scores.

18. The process according to claim 17, wherein a pyramidal ontology is utilized instead of the library ontology.

19. An information search service provision method for carrying out an information search based on a search request from a user and providing a result to the user, the method comprising:
   a first search step of searching a folksonomic ontology database on the basis of the search request, the first search step further including a step of identifying one or more first search categories based on the search request;
   an extraction step of extracting from a library ontology one or more library categories that correspond to the first search categories;
   a second search step, different from the first search step, of searching the library ontology by utilizing the library categories such that the method facilitates access for the user to information in a library;
   a pathfinder creation step of creating as a clue for the information search a pathfinder having a search result from the first search step and a search result from the second search step; and
   a pathfinder provision step of providing the created pathfinder to the user,
   wherein the extraction step comprises:
   a weighting step of applying to the first search categories a weight indicating a distance and similarity to a keyword in the search request;

a derivation score calculation step of applying to the library categories a derivation score that is based on the weight value of the first search categories that correspond to the library categories; and a superordinate extraction step of extracting only a predetermined number of superordinate concept(s) that have high derivation scores.

20. The information search service provision method according to claim 19, wherein in the pathfinder creation step, the pathfinder is created to comprise a pathway from a keyword in the search request to the library categories along with the search result from the second search step such that the pathfinder creation step uses a result from the first search step to extract one or more broad upper concepts from the folksonomic ontology database.

21. The service provision method according to claim 1, wherein a pyramidal ontology is utilized instead of the library ontology.

* * * * *